US007669212B2

(12) United States Patent
Alao et al.

(10) Patent No.: US 7,669,212 B2
(45) Date of Patent: Feb. 23, 2010

(54) SERVICE PLATFORM SUITE MANAGEMENT SYSTEM

(75) Inventors: Rachad Alao, Sunnyvale, CA (US); Jose Henrard, Paris (FR); Alain Delpuch, Paris la Defense cedex (FR); Vincent Dureau, Palo Alto, CA (US); Vahid Koussari-Amin, Los Altos, CA (US); Adam Benson, San Mateo, CA (US); Nicholas Fishwick, Mountain View, CA (US); Waiman Lam, Union City, CA (US); Matthew Huntington, Twickenham (GB)

(73) Assignee: OpenTV, Inc., San Francisco, CA (US)

( * ) Notice: Subject to any disclaimer, the term of this patent is extended or adjusted under 35 U.S.C. 154(b) by 1644 days.

(21) Appl. No.: 10/061,136

(22) Filed: Feb. 1, 2002

(65) Prior Publication Data

US 2002/0147645 A1 Oct. 10, 2002

Related U.S. Application Data

(60) Provisional application No. 60/265,986, filed on Feb. 2, 2001, provisional application No. 60/266,210, filed on Feb. 2, 2001, provisional application No. 60/267,876, filed on Feb. 9, 2001, provisional application No. 60/269,261, filed on Feb. 15, 2001, provisional application No. 60/279,543, filed on Mar. 28, 2001.

(51) Int. Cl.
*H04N 7/025* (2006.01)

(52) U.S. Cl. ................. 725/32; 725/9; 725/34; 725/35; 725/36

(58) Field of Classification Search ............. 725/34–36, 725/9, 14
See application file for complete search history.

(56) References Cited

U.S. PATENT DOCUMENTS 5,870,562 A 2/1999 Butman et al.

(Continued)

FOREIGN PATENT DOCUMENTS

AU 749581 3/2000

(Continued)

OTHER PUBLICATIONS

Notice of the Reason for Refusal in Japanese Patent Application No. 2002-563106; Mailed Sep. 18, 2007.

(Continued)

*Primary Examiner*—Christopher Kelley
*Assistant Examiner*—Timothy R Newlin
(74) *Attorney, Agent, or Firm*—Rory D. Rankin; Meyertons Hood Kivlin Kowert & Goetzel, P.C.

(57) ABSTRACT

The present invention provides a method and apparatus for managing the presentation and regulation of E-Commerce, content and service providers access in an interactive television environment comprising interactions between a server, a client, and a service provider. Components are provided for managing and completing a purchase or delivery of an item offered by a service provider. A purchase transaction uses client information comprising partial client information from the client and a list of purchased items. Upon receiving partial information from the client, the server retrieves corresponding additional related information within its database and transmits this retrieved data from the server, along with the list of purchased items to complete the transaction. Business Agents are provided for logging the transaction, creating an electronic receipt, logging patches, logging error events, and viewer logging. The invention further comprises a method for measuring audience behavior and response to particular events or programs and advertisements; and a method for adaptive delivery of advertisements to a client. Advertisements are scheduled according to an agreement and manifested into campaign rules and desired run times. A profile of a viewer that resides on the client device is used as the criteria for selection of a particular advertisement from a broadcast and for polling of audience viewing habits. The present invention further monitors the integrity and connectivity of the interactive television network and service providers.

64 Claims, 14 Drawing Sheets

U.S. PATENT DOCUMENTS

| | | | |
|---|---|---|---|
| 5,898,838 A | 4/1999 | Wagner | |
| 5,960,411 A | 9/1999 | Hartman et al. | |
| 6,128,653 A | 10/2000 | del Val et al. | |
| 6,131,163 A | 10/2000 | Wiegel | |
| 6,330,550 B1 | 12/2001 | Brisebois et al. | |
| 6,345,239 B1 | 2/2002 | Bowman-Amuah | |
| 6,385,647 B1 | 5/2002 | Willis et al. | |
| 6,385,693 B1 | 5/2002 | Gerszberg et al. | |
| 6,459,427 B1 | 10/2002 | Mao et al. | |
| 2002/0083441 A1* | 6/2002 | Flickinger et al. | 725/32 |
| 2002/0083451 A1* | 6/2002 | Gill et al. | 725/46 |
| 2003/0110499 A1* | 6/2003 | Knudson et al. | 725/42 |

FOREIGN PATENT DOCUMENTS

| | | |
|---|---|---|
| AU | 782015 | 7/2001 |
| EP | 0 722 249 | 2/1995 |
| EP | 1067792 | 1/2001 |
| WO | WO 98/00972 | 1/1998 |
| WO | WO 98/53581 | 11/1998 |
| WO | WO 99/04561 | 1/1999 |
| WO | WO 99/45702 | 9/1999 |
| WO | WO 99/52285 | 10/1999 |
| WO | WO 99/60789 | 11/1999 |
| WO | WO 99/66726 | 12/1999 |
| WO | WO 00/11869 | 3/2000 |
| WO | WO 00/18123 | 3/2000 |
| WO | WO 00/24192 | 4/2000 |
| WO | WO 00/62223 | 10/2000 |
| WO | WO 00/79798 | 12/2000 |
| WO | WO 01/06784 | 1/2001 |

OTHER PUBLICATIONS

Patent Application Laid Open No. 2000-358005.

International Search Report; PCT/US 02/02725; Mailed Feb. 5, 2003.

Droitcourt J L: "Understanding How Interactive Television Set Top Box Works . . . and What it Will Mean to the Customer", International Broadcasting Convention, London, GB, vol. 413, pp. 382-394.

Evain J-P: "The Multimedia Home Platform", EBU Review-Technical, European Broadcasting Union. Brussels, BE, NR. 275, pp. 4-10.

Colaitis F et al: "MHEG and it's Profile for ITV Applications", IEE Colloquium on Interactive Television, IEE, London, GB, NR. 1995/159, pp. 3-1-3-8.

First Official Report for Australian Patent Application No. 2002/242036 dated Sep. 18, 2006.

* cited by examiner

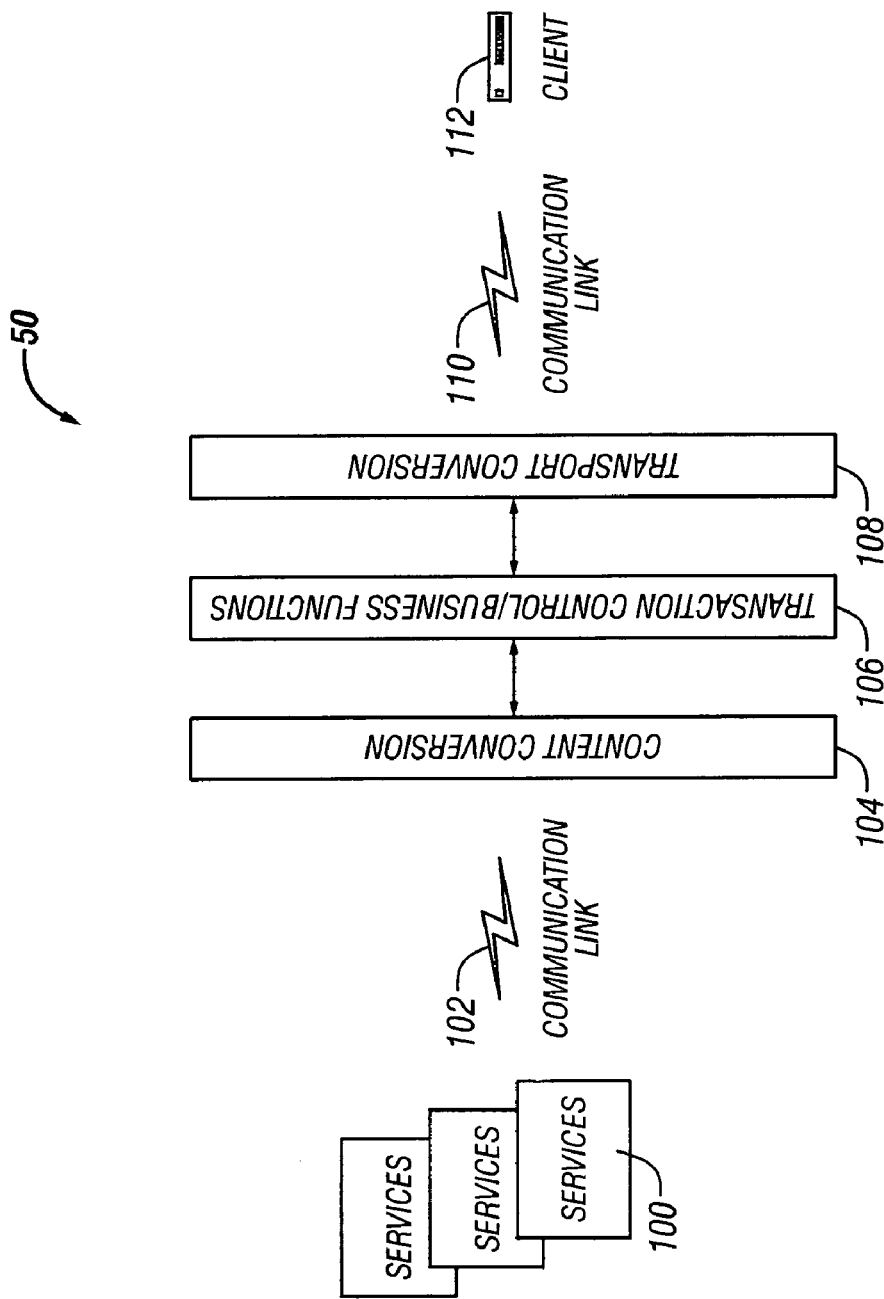

| Name | Type | # Polls | % Responded | % Missed | Down time | Period | # Alerts | Avg delay | Min delay | Max delay |
|---|---|---|---|---|---|---|---|---|---|---|
| HMB 1 BCS* | ICMP | 4087 | 100.00% | 0.00% | 0:00 | 68:29 | 2 | 0 | 0 | 16 |
| HMB NEWS* | Broadcast Server | 4087 | 99.22% | 0.78% | 0:00 | 0:32 | 1 | 17 | 0 | 781 |
| | ICMP | 10 | 100.00% | 0.00% | 0:00 | | | 0 | 0 | 0 |
| | HTTP | 9 | 100.00% | 0.00% | 0:00 | | | 20 | 0 | 94 |
| | Pizza Merger | 10 | 100.00% | 0.00% | 0:00 | | | 267 | 0 | 609 |
| | News Merger | 9 | 100.00% | 0.00% | 0:00 | | | 102 | 0 | 313 |
| | News Publisher | 9 | 100.00% | 0.00% | 0:00 | | | 157 | 0 | 484 |
| | CD Merger | 9 | 77.78% | 22.22% | 0:00 | | | 246 | 0 | 1046 |
| | Cd Publisher | 9 | 100.00% | 0.00% | 0:00 | | | 88 | 0 | 391 |
| | Bloomberg Publisher | 9 | 100.00% | 0.00% | 0:00 | | | 0 | 0 | 0 |
| | Pizza Publisher | 9 | 100.00% | 0.00% | 0:00 | | | 0 | 0 | 0 |
| HMB WEATHER AS | ICMP | 5337 | 100.00% | 0.00% | 0:00 | 89:20 | 1 | 0 | 0 | 203 |
| | HTTP | 5337 | 98.76% | 1.24% | 0:00 | 89:20 | 0 | 12 | 0 | 406 |
| HMB SDK AS | ICMP | 5337 | 100.00% | 0.00% | 0:00 | 89:20 | 0 | 0 | 0 | 234 |
| | HTTP | 5337 | 100.00% | 0.00% | 0:00 | | | 33 | 0 | 500 |
| HMB2 BCS | TCP | 5337 | 99.34% | 0.66% | 0:35 | 89:20 | 1 | 0 | 0 | 0 |
| | Broadcast Server | 5337 | 99.34% | 0.66% | 0:35 | | | 34 | 0 | 500 |
| | ICMP | 5338 | 99.94% | 0.06% | 0:03 | 89:20 | 0 | 0 | 0 | 140 |
| hmb ups1 | ICMP | 5337 | 100.00% | 0.00% | 0:00 | 89:20 | 0 | 0 | 0 | 125 |
| OpenTV Router | ICMP | 5337 | 100.00% | 0.00% | 0:00 | 89:20 | 0 | 0 | 0 | 4000 |
| Service Gateway | Service Gateway | 5337 | 100.00% | 0.00% | 0:00 | | | 6 | 0 | 1031 |
| | LHTTP | 0 | | | 0:00 | | | 0 | 0 | 0 |
| Fetchmail | ICMP | 5337 | 100.00% | 0.00% | 0:00 | 89:20 | 0 | 0 | 0 | 375 |
| | Fetchmail | 5337 | 100.00% | 0.00% | 0:00 | | | 15 | 0 | 391 |
| NC1500 | ICMP | 5337 | 99.98% | 0.02% | 0:01 | 89:20 | 0 | 0 | 0 | 375 |
| RPD2000 | ICMP | 5337 | 99.96% | 0.04% | 0:02 | 89:20 | 1 | 0 | 0 | 16 |
| Reuters | ICMP | 5337 | 100.00% | 0.00% | 0:00 | 89:20 | | | | |

FIG. 12

| File: | weather.dat | | | | | | |
|---|---|---|---|---|---|---|---|
| Last Updated: | 11/15/2001 20:26:32 | | | | | | |
| Status: | OUT OF DATE | | | | | | |
| Schedule: | Mon | Tues | Wed | Thur | Fri | Sat | Sun |
| 0:00 - 9:00 | 120mins | 120mins | 120mins | 120mins | 120mins | | |
| 12:00 | 30mins | 30mins | 30mins | 30mins | 30mins | | |
| 18:00 | | | | | | 480mins | 480mins |
| 21:00 | 120mins | 120mins | 120mins | 120mins | 120mins | | |

| File: | Stock_shares.dat | | | | | | |
|---|---|---|---|---|---|---|---|
| Last Updated: | 11/16/2001 15:30:12 | | | | | | |
| Status: | OKAY | | | | | | |
| Schedule: | Mon | Tues | Wed | Thur | Fri | Sat | Sun |
| 0:00 - 9:00 | | | | | | | |
| 12:00 | 5mins | 5mins | 5mins | 5mins | 5mins | | |
| 18:00 | | | | | | | |
| 21:00 | | | | | | | |

FIG. 13

SERVICE PLATFORM SUITE MANAGEMENT SYSTEM

CROSS REFERENCED TO RELATED APPLICATIONS

This application claims priority from the USPTO provisional patent application entitled "A System for Adaptive Control of Access, Content and Scheduling For Interactive Television" filed on Feb. 2, 2001, Ser. No. 60/265,986 which is hereby incorporated herein by reference; USPTO provisional patent application entitled "A System for Adaptive Control of Access, Content and Scheduling For Interactive Television" filed on Feb. 2, 2001, Ser. No. 60/266,210 which is hereby incorporated herein by reference; USPTO provisional patent application entitled "A System for Adaptive Control of Access, Content and Scheduling For Interactive Television" filed on Feb. 9, 2001, Ser. No. 60/267,876 which is hereby incorporated herein by reference; and USPTO provisional patent application entitled "A System for Adaptive Control of Access, Content and Scheduling For Interactive Television" filed on Feb. 15, 2001, Ser. No. 60/269,261 which is hereby incorporated herein by reference; USPTO provisional patent application entitled "A System for Adaptive Control of Access, Content and Scheduling For Interactive Television" filed on Mar. 28, 2001, Ser. No. 60/279,543 which is hereby incorporated herein by reference.

COPYRIGHT NOTICE

A portion of the disclosure of this patent document contains material (code listings and message listings) to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2001 OpenTV, Inc.

BACKGROUND OF THE INVENTION

1. Field of the Invention

The present invention relates to managing a suite of services in a distributed computer system, and in particular managing an interactive television system suite of services provided to a group of client subscribers.

2. Summary of the Invention

Interactive television systems can be used to provide a wide variety of services to viewers. Interactive television systems are capable of delivering typical video program streams, interactive television applications, text and graphic images, web pages and other types of information. Interactive television systems are also capable of registering viewer actions or responses and can be used for such purposes as marketing, entertainment and education. Users or viewers may interact with the systems by ordering advertised products or services, competing against contestants in a game show, requesting specialized information regarding particular programs, or navigating through pages of information.

Typically, a broadcast service provider or network operator generates an interactive television signal for transmission to a viewer's television. The interactive television signal may include an interactive portion consisting of application code or control information, as well as an audio/video portion consisting of a television program or other informational displays. The broadcast service provider combines the audio/video and interactive portions into a single signal for transmission to a receiver connected to the user's television. The signal is generally compressed prior to transmission and transmitted through typical broadcast channels, such as cable television (CATV) lines or direct satellite transmission systems.

Typically, the interactive functionality of the television is controlled by a set-top box connected to the television. The set-top box receives a broadcast signal transmitted by the broadcast service provider, separates the interactive portion from the audio-video portion and decompresses the respective portions of the signal. The set-top box uses the interactive information, for example, to execute an application while the audio/video information is transmitted to the television. The set-top box may combine the audio/video information with interactive graphics or audio generated by the interactive application prior to transmitting the information to the television. The interactive graphics and audio may present additional information to the viewer or may prompt the viewer for input. The set-top box may provide viewer input or other information to the broadcast service provider via a modem connection or cable.

In accordance with their aggregate nature, interactive television systems provide content from numerous service providers in various different communication protocols that must be understood by the client or viewer who receives the information from the broadcast service provider/network operator. Typically the client is a set top box with a processor possessing limited processing power. There is a need for an architecture that provides a comprehensive management solution for regulation of content, advertising and E-Commerce in an interactive television environment. There is also a need for a comprehensive architecture that provides adaptive control of access, content and scheduling in an interactive television environment. There is also a need for monitoring service provider and the platform connection of and content integrity provided to the interactive television system.

SUMMARY OF THE INVENTION

The present invention provides Service Platform Suite, a method and apparatus for managing the presentation and regulation of E-Commerce, content and service providers access in a distributed computer system. In particular, the present invention operates in an interactive television environment comprising interactions between a server, a client, and a service provider, where the client is a viewer, consumer or purchaser, the service provider is the vendor, and the server facilitates the interaction between the client and the service provider. The present invention comprises a Service Platform Suite comprising components for managing and completing a purchase or delivery of an item offered by a service provider. A service provider can be either external or internal to the server. The invention supports three different scenarios for E-Commerce transactions. In a first scenario, referred to as the pass-through scenario, information is passed directly between a client and an external service provider. In a second scenario, referred to as the partial-host scenario, the server hosts a service catalog but passes the orders to the shops or services for payment and fulfillment of orders. In a third scenario, referred to as the full-host scenario, the server hosts the catalog and also processes the orders.

Preferably, the required information for a client to complete a transaction or make a purchase is stored in a server database. A partial record of this client information is stored on the client device to facilitate a transaction or purchase without compromising security. The client device can operate as a single viewer or multiple viewer device, wherein separate information is stored pertaining to each viewer. A purchase transaction begins when the client activates a transaction by, for example, pushing a button on a remote control device. At this moment, the required information may either be sent immediately or stored on the client device to be sent at a later time, if it is determined that network traffic is currently at a prohibitively high volume or the client is offline. The client transaction uses client information comprising partial client information from the client and a list of purchased items. Upon receiving partial information from the client, the server retrieves corresponding additional related information within its database and transmits this retrieved data from the server, along with the list of purchased items to complete the transaction. An advantage of the invention is the transparency of the cashier, function at the server during the transaction. The client interacts with the server minimally only to log on, if necessary, and to review an order and choose a form of payment. Thus, the interaction between the server database providing client information and the service provider is transparent to the user.

The central managing component for the transaction on the server is the Interactive Service Manager (ISM). The ISM comprises Business Agents which handle different aspects of the purchase transaction. Business Agents provide for logging the transaction, creating an electronic receipt, logging patches, logging error events, and viewer logging.

The invention further comprises a method for enabling interested parties to measure audience behavior and response to particular events or programs and advertisements. A quantitative profile is created of the client based upon the client's viewing activities and clicking activities in response to previously displayed advertisement banners or programs. This profile is stored on the client device. This information can be mined or pulled from the client device by the head end server for use in a statistical poll of viewer behavior. Statistical polls do not compromise the personal information relating to a data sample of viewer participants. Pulled information is compiled and stored on the head end server for access by ratings agencies having business agreements with the server. Further compilation of pulled information is also further compiled for internal reports.

The invention further comprises a method for adaptive delivery of advertisements to a client. The server provides an interface with a service provider to schedule an advertisement with the server. Advertisements are scheduled according to an agreement and manifested into campaign rules and desired run times. Advertisements are placed in a broadcast stream upon being filtered by criteria such as the campaign rules and agreed upon business rules. An advertising service provider can upload and remove advertisements on the server. When scheduled, a group of advertisements are transmitted to a broadcast stream, whereupon an advertisement is selected from this group for display to the viewer. A profile of a viewer that resides on the client device is used as the criteria for selection of a particular advertisement and for polling of audience viewing habits.

The Service Platform Manager of this invention further monitors the integrity and connection of the interactive television network. The platform monitor is a distributed software method with no central database required. The operator of the Service Platform Manager checks for connectivity at the machine level through ports, checks for operation on the process level of the activity of the server, and checks for file integrity on the data level to ensure, for example, the currency of a file. The operator of the Service Platform Manager can select or remove services provided from service providers from a list of items to be monitored. The Service Platform Manager also creates statistical reports, and has an alarm system that can be set to automatically run a test at a given time or on a given schedule, as desired by the operator. In one embodiment of the invention, the Service Platform Manager is presented on a personal computer. In another embodiment, the Service Platform Manager operates over other digital interfaces, as in, for example, a cell phone, or a PDA. In another embodiment, the invention is provided on a computer readable medium, including any kind of computer memory known or unknown, comprising floppy disks, conventional hard disks, CD-ROMs, Flash ROMs, non-volatile ROM and RAM, on which instructions are stored that when executed cause a computer to implement the present invention.

BRIEF DESCRIPTION OF THE DRAWINGS

Other objects and advantages of the invention will become apparent upon reading the following detailed description and upon reference to the accompanying drawings in which:

FIG. 1A illustrates a high level Architecture Diagram for a preferred embodiment of the Service Platform of the present invention;

FIG. 12 shows the Network Monitor page of the Service Platform Manager; and

FIG. 13 shows a shelf life for data monitoring.

DESCRIPTION OF PREFERRED EMBODIMENT

Figure 1B:
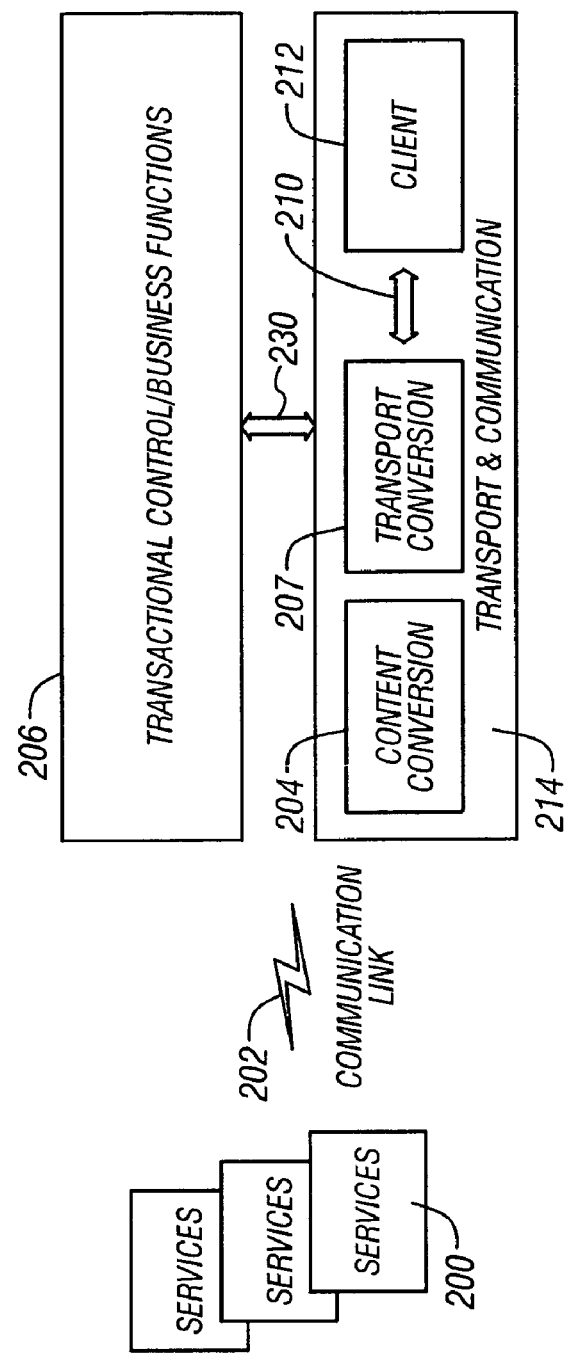
FIG. 1B illustrates an alternative embodiment of a high level Architecture Diagram for a preferred embodiment of the Service Platform of the present invention.

The following description describes several examples of preferred embodiments of the present invention.

Introduction

Account comprises five major components as follows: a Proxy component; an Application Server component; a Data Repository component; a Registration component; and an Administration component. The Proxy component is located in a communication link between the client device and the service provider's commerce server. The proxy component functions as a proxy server. Proxy intercepts messages transmitted between a client device and a service provider server. Proxy passes the message to the Application Server for processing (if necessary) and forwards the message to its original destination. Proxy is a bi-directional server, in that it can intercept both the requests or messages from the client and the responses from the server provider's server.

Messages are filtered by Proxy component so the Network Operator (NO) can control entitlement, that is, which client can send messages, which service provider can receive messages and what kind of messages can be sent. Thus, the NO can provide a portal or a walled garden to control all the interactive services available to NO subscribers or clients.

The proxy component processes any message format, preferably, the message is ASCII based and the protocol is http. Account is built on top of the proxy component, which is transparent from both the client and the server provider standpoint, this makes the present invention unique in a sense that the insertion of the viewer data into the message is carried out transparently without affecting the original transaction steps.

The application server component comprises: an Interactive Service Manager; a Business Agents; and a Data Access Component. The Interactive Service Manager (ISM) is the key component of the Application server. The ISM looks at message headers to and from the client and server. When a message is being sent from the client to the service provider, the message headers (including the cookie headers) contain information to identify which application is sending the message (application identifier); which device is sending the message (device identifier); which viewer inside the household is sending the message (viewer nick name); the authentication PIN for the viewer; whether the message needs Account processing (processing flag); and what kind of processing is needed: synchronous processing or asynchronous processing (async flag). Based on the information provided in the message headers, the ISM performs the several tasks. Based on the information from the data repository, the ISM ensures that the application has permission to send messages (application identifier corresponding to an active application in the data repository—application; and entitlement); the device is allowed to send messages (device identifier corresponding to an non delinquent device in the data repository—device entitlement). If processing is not needed, the ISM returns the message back to the proxy component that forwards the message to its original destination. Otherwise, ISM continues processing the message. Distributed processing can also be employed here: the client device can scan the message first before sending it, and determines if the message does not contain any Account keywords, if not, the client or ISM sets the processing flag to 0. Also during the application development time, the application developer may know whether a message will contain any Account keywords, if not, then the processing bit can be set to 0. The parameters (including processing and async bits) can vary from message to message, so within one transaction session, the parameters can change from message to message.

There are two methods for asynchronous processing: First, Store and Forward asynchronous processing is used by the client device to reduce the peak load of the communication link between the client and the server. When the communication link is busy or when the client application is programmed to support store and forward, the client device stores the transaction request into either a transient memory (RAM) or persistent memory (flash, hard drive), and will forward the request to Account at a later time. This time delay can be a random parameter; a calculated parameter (based on the current time and point-to-point network parameters); or a combination of both.

Second, if the message is denoted as asynchronous (either by a flag in a message header or an application configuration parameter in the data repository), ISM places the message into a queue and returns a response to the proxy which will then send the response back to the client. The response notifies the client that the message has already been placed into a queue and the transaction outcome will be sent later (e.g. email, SMS, etc). Asynchronous message reduces the peak load to the service provider's servers as the message is cached in Account before forwarding to the service provider. In addition, the cache is centralized in the Account thus it becomes unnecessary for each service provider to provide its own cache.

ISM scans the message and searches for Account special keywords. Each keyword corresponds to a special operation to be performed by Account. Each keyword has two parts: keyword itself and the parameters provided by the client. Some of the keywords are viewer's contact information (e.g. shipping and billing info); viewer's e-wallet information (e.g. credit card info); viewer's address book information (friend and family information including instant message buddy list); and transaction (e-receipt) information. The targets of the keyword operations are a data repository and the message itself. Each keyword corresponds to retrieving a piece of a record from the data repository, writing (or creating) a record into the data repository, or deleting a record from the repository. Additional actions corresponding to keywords may also be defined.

After ISM processes a keyword, ISM replaces the keyword with the record from the data repository; removes the keyword; and/or swaps the keyword with its parameter. In order to enable the NO to hide the viewer identity from the service provider and make sure that no viewer information is released without the permission of Account, Account employs the concept of a session identifier. The message between the proxy and the client contains information in the message headers to identify the device (device identifier) and the viewer (viewer nickname). The device identifier and viewer nickname are persistent data items that do not change unless changed by the client device or client device user. This information is removed by the proxy and replaced by a session identifier. The proxy component that accesses the device identifier is not available to the service provider or a service provider application to maintain the integrity of the secrecy of device identifier hidden from the service provider. This session identifier is transient, that is, it only valid within a transaction session, thus, the service provider is only able to use the session identifier to relate to messages corresponding to the same session. The session identifier becomes invalid in a different transaction session so the service provider is not able to use this transient session identifier to identify any viewer. The session identifier is generated by a functional output of the viewer identifier combined with an expiration parameter. This function is unknown to the service provider when only identifier Account or the NO know. Only the Account or the NO are able to resolve the session identifier back to the original viewer identifier. The functional output can be further encrypted to prevent hacking of the original viewer identifier randomly, but Account maintains a mapping table between the session identifier and the viewer identifier.

Furthermore, the session identifier prevents the application from recording the received viewer information and linking it with the device identifier. The device identifier is generated by a component outside the control of the application (e.g. the link or the conditional access component) and the application has no knowledge of this piece of information.

ISM regularly reads its configuration parameters from the data repository. The new data is read into a temporary location first without overwriting the original data and any new message will use the newly read data. The original data will be released once all the messages which used the original data have finished processing. By employing this mechanism, the configuration parameters of ISM can be updated on the fly without stopping the ISM. Business Agents are provided as supporting components to ISM, which each business agent to performs some special business functions. The main business agent features are: Transaction (E-receipt) Business Agent also referred to as Transaction Manager (TM)).

TM facilitates a transaction by creating a transaction identifier for each new transaction. Each message within the same transaction session is tagged by the same transaction identifier. TM logs the details of each transaction comprising transaction date, amount, currency, status, and descriptions. With the appropriate keywords, the TM business agent retrieves e-receipts and details for a specific viewer from the data repository.

The Viewer Business Agent also referred to as the Viewer Manager (VM), with the appropriate keywords, VM retrieves, updates (or creates), or deletes a viewer's record. VM performs authentication (viewer entitlement) on the viewer by verifying the viewer nick name and the PIN matched the ones stored on the data repository. Logging and Error Business Agents log each message into the data repository for later data mining and reporting purposes. They also log the occurrence of each keyword into the data repository for later data mining and billing purposes.

Each Business Agent registers with ISM and notifies ISM what keywords it can handle. The notification can be either through initialization of the Business Agent during ISM start up time or through entries in the data repository. The ISM provides a table that maps each keyword to a set of Business Agents that can handle the keyword. The ISM scans a message, and once it finds a keyword, ISM calls the corresponding Business Agent(s) to process the keyword(s). The ISM and the Business Agents communicate with the data repository through the Data Access component. The DAC isolates the data repository from rest of the system so that if the data repository needs to be replaced by a different vendor or different technology (e.g. LDAP instead of Database), only the data access component (DAC) needs to be replaced without affecting the rest of the system.

DAC maintains a pool of data repository connections and uses this pool of connections optimally for its database operations. DAC interface with the ISM and Business Agents to perform data repository operations such as reading records, updating or creating records and deleting records. ISM and the Business Agents can interface with the DAC either synchronously or asynchronously. In synchronous DAC operation, the function call is processed at the calling time. In asynchronous DAC operation the function call is first put into a queue and processed later. This is different from the asynchronous message concept.

A data repository component stores essential information on which Account operates. Most of the information is stored on a data repository server connected to Account, but a portion of the information can be distributed and stored in the client to reduce input by the viewer. The information stored in the repository server can comprises: Viewer's related information (address info, e-wallet info, address book info); Transaction (e-receipt) related info (order date, amount, shop name, status, etc); ISM configuration parameters (logging level, etc); and Network, service provider, application and device information.

The information stored on the client can comprises: a list of viewers and the nicknames in the household; and a partial e-wallet information such as the alias of a credit card (e.g. issued bank name) or the last four digits of a credit card. This information can be used for commerce purposes by reducing the entries need to be entered by a viewer. Account also provides a registration component so that a viewer can register on line through the client device. This component enables a viewer to: create a profile and providing necessary info (e.g. name, address, e-wallet etc) to the data repository; update viewer profile info; and review e-receipt (transaction) history.

The present invention enables Sharing Personal information. Once an individual is registered with a data repository they can decide to share their personal information. The owner of this information can subsequently grant privileges to this personal information. Privileges to this information include view, update and delete. Once this information is shared it can be used by multiple applications, such as transaction information for e-commerce activates. This shared information is accessed through the same "keyword process" mentioned in this embodiment.

For example, an address book can be shared. A viewer can grant access to their address book information, such as grandma's address and phone number. Once shared, this information can used by all viewers associated with the sharer's household or within a defined group of permitted users. For example, shared address book information would be useful in a flower shopping application. In this case a viewer who had purchased flowers, when prompted for delivery information, the flower purchase application would retrieve a list of personal addresses plus shared addresses from all the viewers in the household or all the permitted users of shared information. One would then choose an addressee for a delivery or ship to address. In this case, specifically grandma's address as it would most likely be a shared address by household members. An application is also provided that enables a viewer to setup and/or create an e-wallet containing personal information such as credit card number or bank account number. Once setup, the owner of this e-wallet can grant usage privileges to use this e-wallet information to enable other members of the household to use the credit card or bank account number. Once a viewer has placed an order with a shopping application, the viewer would be prompted for a series of confirmations, this would include e-wallet details that had been shared by another member of the household and their personal e-wallet details. The viewer would then select the e-wallet of their choice which would then be passed to the appropriate shop.

An Administration component is provided which enables the NO to control and configure Account operation; configure network, service provider and application parameters; to retrieve, modify or delete viewer information in the data repository; and to generate various reports related to the activities through the Account.

Turning now to FIG. 1A, the Service Platform Suite (SPS) 50 comprises a group of applications roughly divided into three categories, Content Conversion 104, Transaction Control/Business Functions 106 and Transport Conversion 108. The SPS enables Service Providers 100 to interact with a client 112. The Service Providers 100 communicate through a communication link 102 to the SPS 50. The SPS 50 in turn communicates with a client 112, e.g., a DCT 2000 Set Top Box (STB). The client 112 may be a STB, a digital assistant, a cellular phone, or any other communication device capable of communicating with the Service Platform Suite through communication link 110. The Content Conversion 104 and Transport Conversion 108 services provide the content and communication functions, and the Business Function services provide the Business Control functions for conducting transactions between services and clients via the SPS.

FIG. 1B shows a more general architecture than FIG. 1A. In FIG. 1B, Transaction Control/Business Functions 206 are distributed between the Service Platform Suite and the more powerful client 212, e.g., a DCT 5000 STB. For example, a more powerful client can perform some business functions (e.g. implement advertising campaign rules and advertising/ business filters to select advertisements viewed) and select contents, which are more suitable to the client 212 (e.g., select an advertisement or program which fits the user profile). The functions are performed at the server for less powerful clients, e.g., DCT 2000 STB or cell hone.

Figure 2:
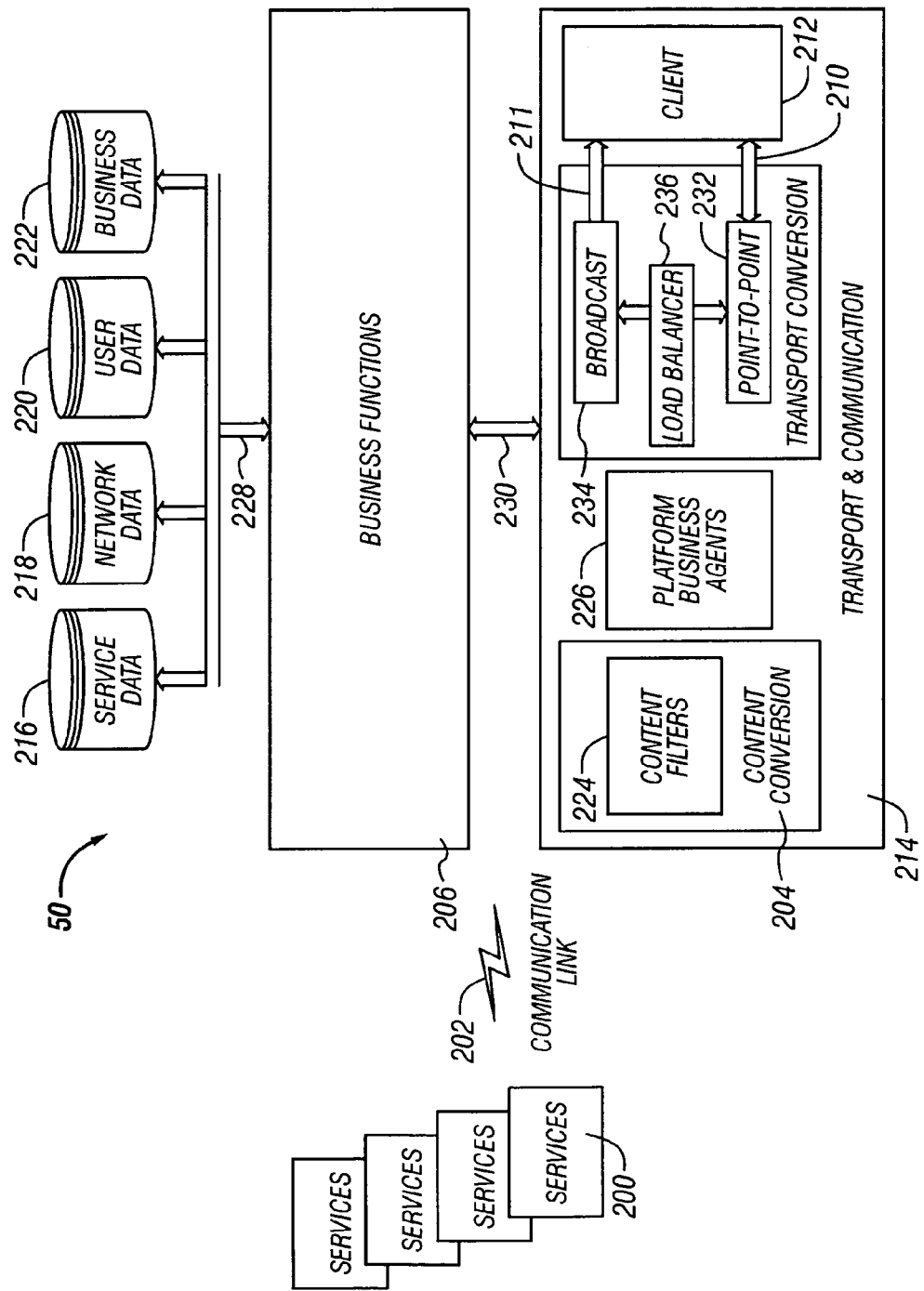
FIG. 2 is a more detailed description of the high level Architecture.

The SPS Functions are expanded in FIG. 2. As shown in FIG. 2, Transport and Communication 214 comprises Content Conversion 204, Business Agents 226, and Transport Conversion 207. Content Conversion 204 contains Content Filters 224. The Transport Conversion 207 contains a Broadcast 234 stream communication function, a Load Balancer 236 function and a Point-to-Point (Pt-to-Pt) 232 communication function. The Business Functions 206 access Service Data 216, Network Data 218, User Data 220 and Business Rules 222.

Figure 3:
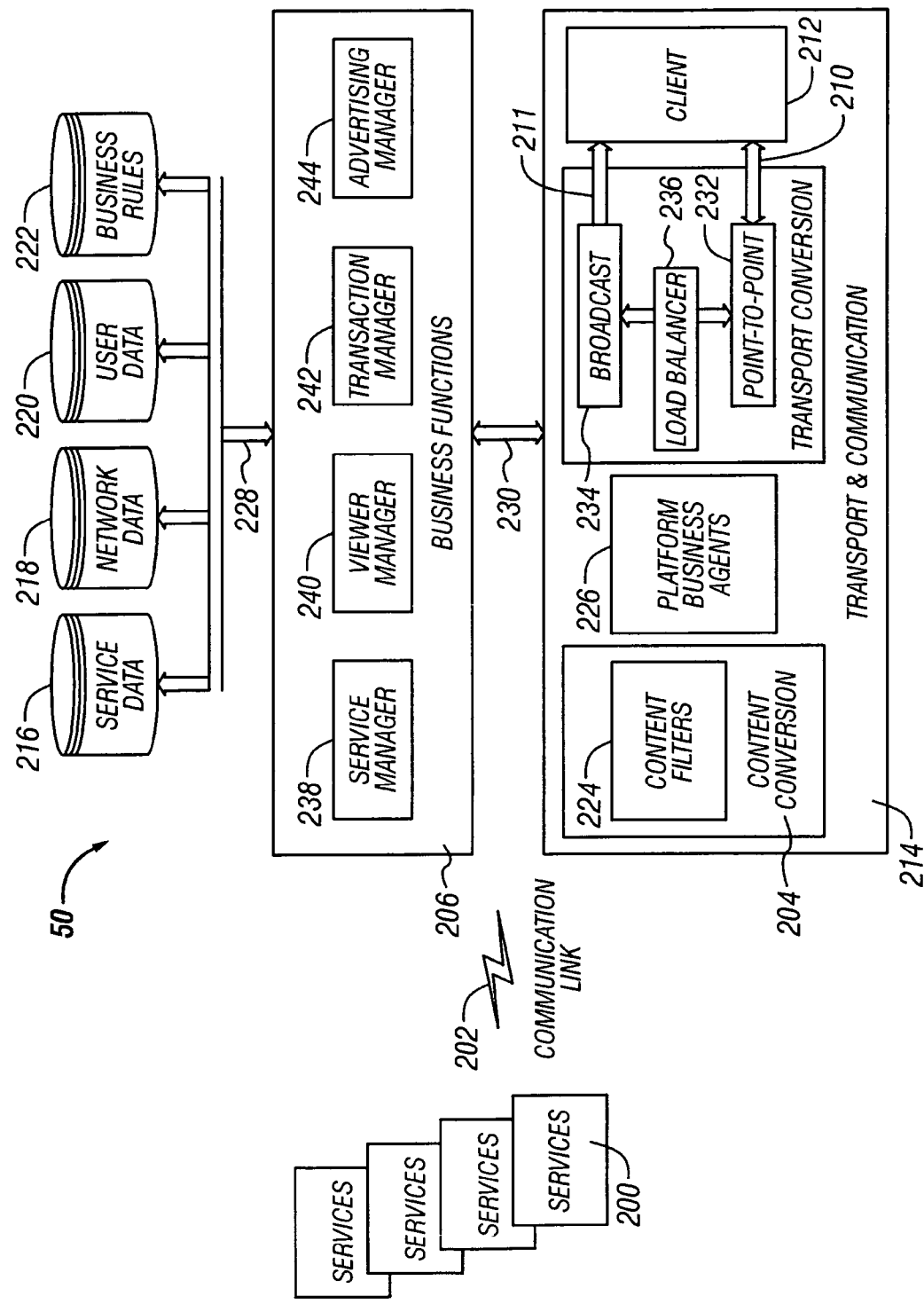
FIG. 3 is a more detailed description Architecture Diagram of FIG. 2.

The functions of FIG. 2 are expanded in FIG. 3. As shown in FIG. 3, the Business Functions 206 comprise four major functional components: Service Manager 238, Viewer Manager 240, Transaction Manager 242, and Advertisement Manager 244. One example of a high-level operational flow for a preferred embodiment follows.

Referring to FIG. 3, a Service Provider 200 negotiates with a network operator to offer a service to subscribers via the operator's SPS 50. The network operator uses the Service Manager 238 to register the services and the negotiated business rules 222 (e.g. schedule, bandwidth requirements, provide some level of service access to viewer information) associated with the service. The Service Manager 238 stores Service data 216 (e.g. URL address, content). Based on the business rules 222 and Service Data 216, Service Manager 238 communicates with the Broadcast Communication 234 function to retrieve the content from the content provider.

When the content is retrieved from the Service Provider 200, it may be processed by the Content Conversion 204 and Content Filters 224 to convert the content into a form suitable for the client device 212. The Broadcast 234 function converts the content into a form suitable for the broadcast 234 network. The converted content is received by the client 212 over broadcast link 241. Client 212 and Service Provider 200 interact via Point-to-Point link 210 and Point-to-Point function 232, which are part of Transport Conversion 207. The Service Provider 200 comprise shopping, audio/video, gaming, voting, advertisement, messaging, or any other service.

Client 212 communicates through Point-to-Point 232 communication link to the SPS 50 and Service Provider 200. Load Balancer 236 interacts with the Business Functions 206 to determine the optimal load distribution between the Broadcast 234 Communication link 211 and the Point-to-Point 232 Communication link 210. The Business Agents 226 use business rules 222 to control the interaction and exchange of information between the Service 200 and the client 212. For example, the network operator may choose to prevent Service Provider 200 access to user information. Service Provider 200 preferably pays a fee based on the Business Rules 222 and Service data 216 to access the user information.

Viewer Manager 240 stores client/user information in User Data 220. Business Agents 226 control the flow of viewer information to the Service Provider 200. Transaction Manager 242 records transactional information exchanged between the Service Provider 200 and Client 212. Based on the Business Rules 222 and the User Data 220, Advertising Manager 244 determines which advertisements and which type of advertisements will be presented to the client via Broadcast 234 link 241 and Point-to-Point 232 link 210.

Figure 4:
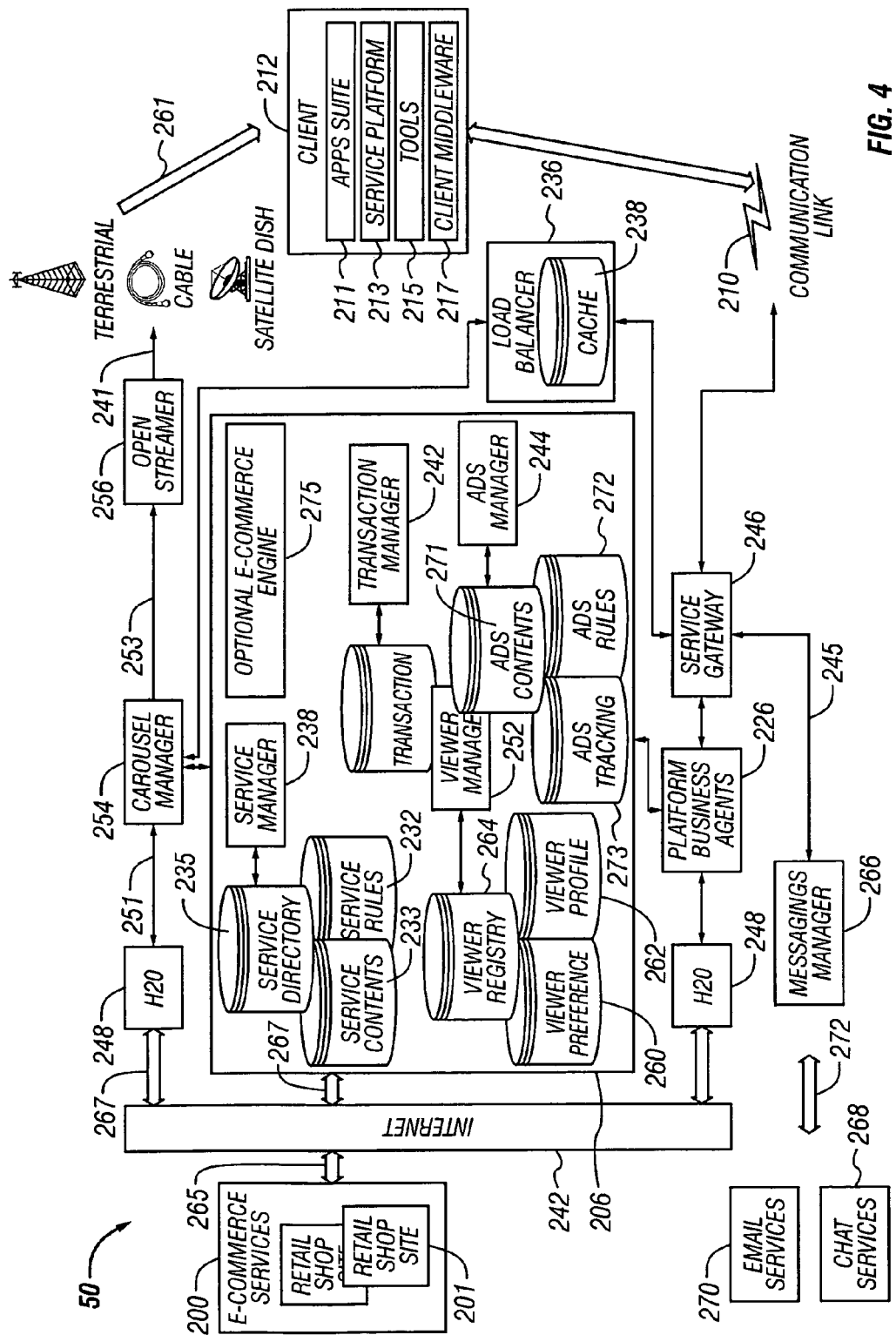
FIG. 4 illustrates an example of a preferred embodiment of the Service Platform of the present invention.

FIG. 4 illustrates another example of a preferred implementation of SPS 50. Service Provider 200 provide shopping, chat, and other services either over the Internet or over another network or communication channel accessible to the network operator. Using the SPS, the network operator (NO) accesses those services. Business Functions 206, comprising Service Manager 238, interact with Carousel Manager 254 to retrieve content from a Service Provider 200. The carousel comprises a repeating stream of audio/video/interactive data broadcast to clients from the SPS 50. Carousel Manager 254, Transaction Manager 242 and Service Manager 238 control the content insertion and deletion from the broadcast carousel. Service content is retrieved, converted into a client suitable format by H2O 248. H2O 248 is a possible implementation of Content Conversion 204 and Content Filter 224. H2O converts HTML Content into Service Platform/Client readable content. The converted content is formatted into a data carousel and multiplexed by the Open Streamer 256 for broadcast to the client 212. Client 212 interacts with the services and if necessary communicates with the SPS 50 and the Service Providers 200. Point-to-Point communication goes through Service Gateway 246. Load Balancer 236 interacts with Business Functions 206, Carousel Manager 254, and Service Gateway 246 to determine the optimal load between the Broadcast link 241 and the Point-to-Point Communication link 210. Business Functions 206, interact with the Business Agents 226 to control access and information exchange between the Service Providers 200 and client 212.

Figure 5:
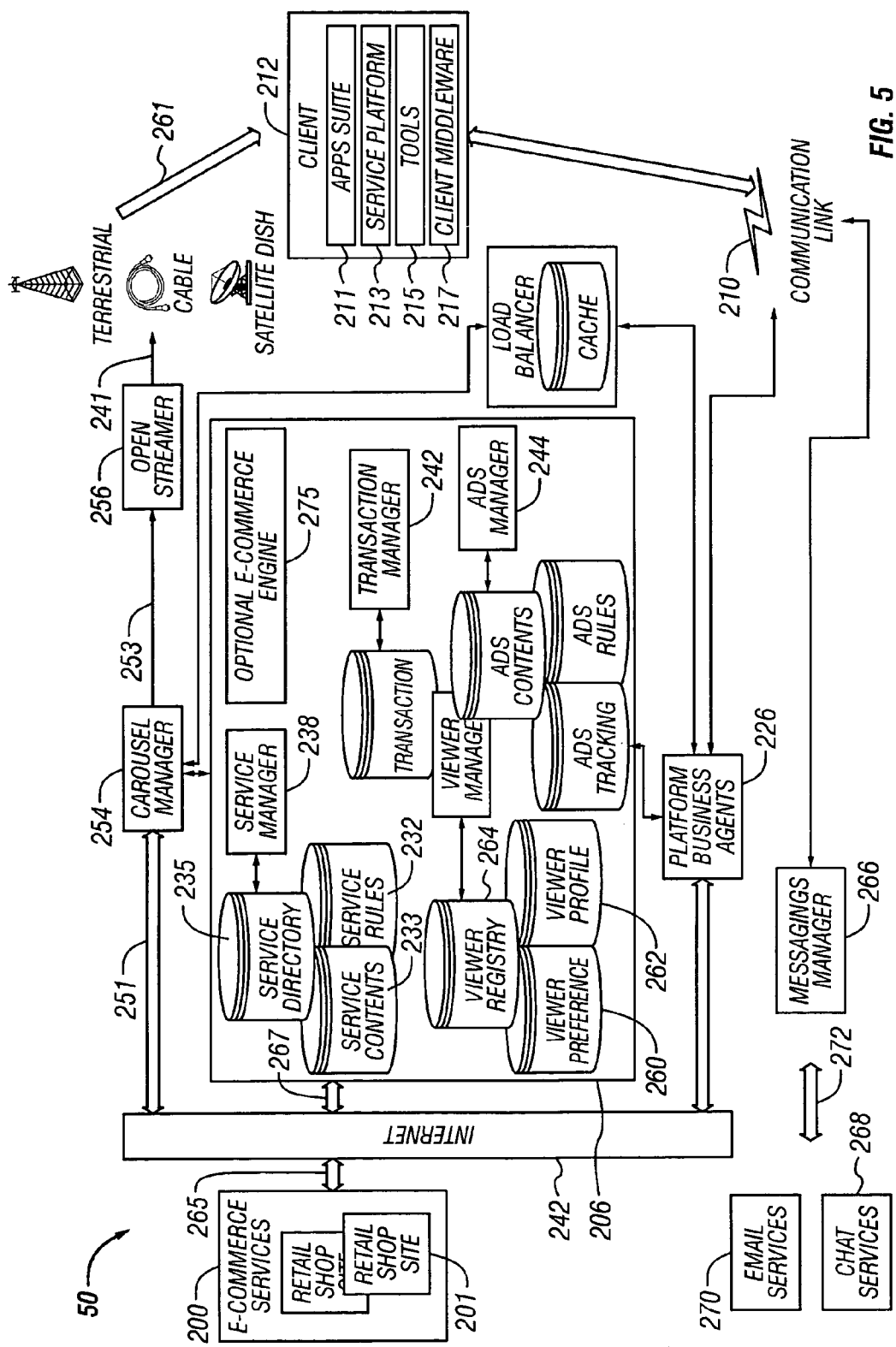
FIG. 5 is an example of an alternative embodiment of the Service Platform of the present invention.

FIG. 5 shows another alternative embodiment of the SPS in an environment where the client device possesses more processing capability, for example, when utilizing a Motorola DCT 5000 STB rather than a DCT 2000. Both Content Conversion (e.g. H2O) and the Point-to-Point Transport Conversion (Service Gateway/DAPT) are subsumed in the Client 212 processor. Thus, the client 212 can communicate with the Service Providers 200 directly. Business Functions 206 and other SPS components still perform their corresponding functions as previously described.

Service Gateway is the return-path enabling component of the Service Platform Suite. It connects STB clients with content provider backend systems. Messages are forwarded from STB clients to content provider backend systems using the standard Internet protocols including HTTP and SMTP. The Service Gateway uses protocol adapters to translate between the low-level communications protocol used by the set-top box and the higher-level Internet protocols. Service Gateway uses an efficient and lightweight protocol called DATP (DigitalTV Application Transfer Protocol) to transport message over the set-top box return path network. This saves valuable STB resources and enables low-end STB unable to support such a communication stack to interact with standard Internet applications servers. The return path networks can be, for example, the open Internet, a VPN (virtual private network) or closed WAN (wide area network).

SPS enables a NO to achieve a critical mass of a broad range of interactive services for the viewers, thereby enabling achieving regular and repeated use of services by viewers. Transaction-enabling services enables a NO to extend revenue opportunities available from interactive services. SPS enables management of the advertising inventory across all interactive services and targeted advertisements and enables many services (publishing, advertising, t-commerce and messaging) to be integrated into iTV applications. The features of SPS enable an NO to retain control of the customer relationship with the end viewers, leading to better customer services. Through order tracking, SPS enables network operators to offer an appropriate level of customer service to its viewers and content providers. The use of existing Internet standards enables SPS to use commodity infrastructure components. Using SPS, NO can centrally manage the interactive services offered over their network.

SPS enables content providers to rapidly develop and deploy new iTV applications at costs comparable to standard web development. SPS enables content providers to reuse existing Internet based infrastructure, processes and procedures for both publishing content and handling transactions. SPS enables real-time dynamic update of iTV applications, enabling content providers to provide applications with information that is accurate and up to date to seconds. At a basic level SPS enables content providers controlled access to viewer details including preferences and e-wallets. At an advanced level SPS enables content providers to benefit from business intelligence gained from viewer usage of all iTV applications. Content providers can use this to provide personalized services including features such as targeted promotions and recommendations.

SPS enables providing a consistent experience for viewers, making applications easier for viewers to use. Viewers can transact with the knowledge that their personal information and credit card details are secure. Unified and integrated communications enable viewers to communicate quickly and easily using email, chat, instant messaging or text messaging (SMS). Viewers can enjoy applications personalized to their requirements and profile, through defined preferences or transparent profiling. This leads to promotions, recommendations and advertising that are relevant to the viewer.

E-Commerce Support Scenarios

An overview of the application of the SPS of the present invention and a discussion of each of the functions depicted in each of the figures follows. One of the prime purposes of the SPS is to enable a network operator to provide and manage electronic commerce. Different E-Commerce scenarios are supported by the SPS, depending upon the network operator's and its selected services' requirements. The SPS enables flexibility in the operator's level of involvement in E-Commerce.

In each of the E-Commerce scenarios discussed below, the network operator controls the portal and decides what kind of shops and/or services can appear in the portal. The SPS has control on the flow of viewer information in all scenarios. The first E-Commerce scenario is referred to as the "pass through" scenario, in which the SPS is a middleman between the services and the client. The SPS does not host product catalogs offered by services (for example, a list of books and prices offered by a service) or handle orders (e.g., purchasing a book from the service via the SPS). The SPS only controls access to viewer information and logs service transactions. The second scenario is referred to as the "partial host" scenario in which the SPS hosts the service catalog but passes the orders to the shops or services for payment and fulfillment of orders. In a third scenario, referred to as the "full host" scenario, the operator hosts the catalog and processes orders.

The SPS 50 enables a network operator to support all three scenarios in one network simultaneously. Some services can choose to operate under the pass through scenario, some services can choose operate under the partial host or full host scenarios. The SPS supports all three E-Commerce scenarios simultaneously. For example, minimum commerce involvement is required of the operator in the pass-through scenario, where the SPS acts mainly as a conduit between service clients. However, even if the operator's involvement with commerce is minimal, it is often desirable that the network operator be able to answer a customer's calls. For example, the customer might be unable to determine from which service he purchased and will call the operator when a problem occurs. Thus, good customer relations dictate that the operator track orders, if only to redirect the viewer calls to the proper service to answer questions and solve problems with orders.

A second level of operator involvement is required in the partial-host scenario, which comprises E-Commerce enabling without fulfillment/payment operation. In this case, the Service Platform Suite enables the NO to build E-Commerce services (shopping, chat, movie orders, etc.), control the flow of service transactions, host a services products database, and provide an internal E-Commerce engine as a default solution. The SPS, however, does not process payment for and fulfillment of orders from the client to the service. The partial-host scenario enables E-Commerce enabled services to run their own custom E-Commerce infrastructure outside of the SPS and provide their own, custom service-created interface with their own E-Commerce engine.

The third level of operator involvement is required to support the full-host commerce capability, which is completely controlled by the SPS. In the full-host scenario, the SPS controls the service access to the network and to client or viewer information. The network operator performs portal administration comprising adding and removing services; changing service properties in the Service Data (store/shop/service version, type of store/shop/service, type of product, bandwidth, scheduling, etc.) and updating service product offering catalogs.

The SPS also enables the NO to manage macro functions that operate across the various shops or services. For example, the SPS enables offering a list of stores/services, products offering page and a search capability across all the shops/services. The SPS also provides a mall directory function and a global product search engine across different shops. The SPS enables administration of the portal look and feel and provides extensive adaptive operator control of advertising space, content and scheduling. SPS viewer profiling enables adaptive advertising and content management. Adaptive management further comprises operational monitoring of traffic peaks and transmission failures.

The Service Platform Cache 138 also enables staging of content in Cache, that is delaying or checking service content broadcast before broadcast to clients. The Service Platform Transaction Manager records all transactions in the Transaction Database to ensure accurate operator revenue collections (even when the STB is turned off) and subscriber profiles in Viewer Profile 162 and Viewer Category 160 (viewer buying and viewing habits), which provides added value data to the network operator.

The SPS protects the operator's valuable subscriber profile database by requiring viewer information be given to service exclusively by the network operator, and under the network operator's control. To protect the subscriber's identity, an abstracted user identifier (i.e., session identifier) is transmitted to the service during the session that the service transmits transaction details to the SPS. The user identifier or session identifier is session specific. There can be more than one user identifier associated with a client device, as when different family members use the same STB. Each family member and the household STB can be individually assigned a viewer category, tracked and profiled by the Service Platform Viewer Manager. The Service Provider only knows the client or STB identifier through a session identifier. Only the network operator can resolve a session identifier into viewer information details (name, address, shipping information, client device hardware identifier, etc.) needed for fulfilling an order. Without the client device hardware identifier, Service Providers cannot contact the client device without going through the SPS. Thus, the client device hardware identifier is not revealed to the Service Provider. An exception can be made for a credit card number or other information, if the operator does not wish to perform credit card collections or other transactions. The capabilities of the SPS are selectable.

The transaction log is also useful for mining a client's viewing and transaction data for generating cumulative user profiles or used for more sophisticated profiling techniques such as collaborative filtering. Viewers or clients are placed in one or more categories (e.g., "sports fan", "chef-French") based on viewer user profile. Categories enhance the network operator's ability to perform adaptive targeted advertising and broadcasting based on long term and short-term viewing and buying trends of the viewer/client.

The SPS provides a Wallet function, which provides a checkout/purchase support function. The Wallet function is supported by the SPS, although selected shops or services may bypass the wallet function in favor of their own checkout procedure. The Wallet function records and accesses data regarding the viewer profile, viewer category, and transaction log. Thus, the Wallet minimizes typing or input of data by the user. This function is particularly useful when user is ordering via a TV remote control with limited data entry capacity. Typically, content for the Wallet function is a credit card number stripped out of 4 last digits, so that the user only has to complete the last 4 digits or the shipping address for confirmation.

Optionally, all user information is placed in the Wallet Function, hidden from the service. Wallet information exists in both the SPS and the client. The Wallet information on the SPS preferably contains as much information as possible, including client shipping address, client full credit card number, etc. The Wallet information in the STB may only contain partial information such as the last 4 digits of the credit card to remind the viewer which credit card on which a purchase was made. Partial information is stored in the STB for protection from untrusted persons using the STB and untrusted applications, which can access the STB data.

As linking occurs, such as, when a viewer's click triggers the call of an E-Commerce application or service, the SPS determines the subscriber's navigation location and records it in the Transaction Database 158. The SPS also determines and records when the viewer followed a link to a store, or which program the viewer was watching when he/she made the decision to purchase (referred to as an "impulse buy"). The Transaction Database 158 enables the operator to store and provide a detailed context and purchase history to subscriber. Such storage of context and purchase history is also useful to improve subscriber profile and category information and which can generate additional revenue and/or become part of a channel deal with an E-Commerce provider.

The SPS publishes a service catalog (which can be HTML based). The SPS supports impulse buying and scheduling for support of E-Commerce. The SPS also provides a Store and Forward functionality, which enables management of transmission peaks for a large number of orders and reduces communication costs. Click-through interactive advertising is supported by the SPS support, since ordering a brochure is equivalent to a zero-money commercial transaction.

The default (and optional) E-Commerce engine provided by the SPS provides fast and easy E-Commerce shop page building; multi-shop hosting; catalog based E-Commerce (broadcast and on-line); impulse buying; built-in Email capability; dynamic/adaptive page generation to facilitate marketing campaigns (gifts, personalized promotions, welcome specials, etc.); personalized rules for catalog page building; real-time transaction support (e.g., ticketing); transaction control; advertising campaign measurement reports; and synchronization with an Electronic Program Guide (EPG) for impulse-buying.

The SPS E-Commerce component increases network operator revenue per subscriber by enabling E-Commerce transactions from the TV. The Service Platform Suite increases and enhances the network operator's knowledge of its subscribers' viewing and buying habits for adaptively targeted marketing. The Service Platform Suite provides a valuable database of a "portal" or "walled-garden" of households' purchasing habits and preferences, accelerates development reduces the cost of deployment of E-Commerce enabled services by providing a productivity tool to rapidly create interactive E-Commerce shops and services.

The Service Platform Suite enables services to rely on their own internal staff to create an interactive TV presence and if necessary use the network operator's default commerce engine provided by the SPS, which is optimized for TV broadcast and interaction with the viewer. Thus, the SPS reduces operation costs (broadcast management, store and forward, etc.), thereby increasing the value or revenue generated by the operator's bandwidth.

The SPS enables a network operator to facilitate E-Commerce deployment on its own network and to capture a share of the E-Commerce revenues. The SPS Wallet function enables the NO to manage credit, impose spending limits and enable micro-payments. Services may interact with the Service Manager and Viewer Manager to provide a group of services from which the NO via SPS chooses to present to clients based on viewer profiles and categories. The NO may conversely reveal its subscriber profile to a service provider to request specialized viewer targeted offerings and advertisements to subscribers.

The SPS provides catalog broadcast publishing and on-line transaction execution with external E-Commerce platforms. The SPS also provides a centralized transaction log for operator use. The SPS provided E-Commerce engine provides a SKU repository; product offering catalog creation and administration tools; catalog search engines; shopping cart functionality; order repository and management functions; order fulfillment and administration; product inventory tracking and administration; adaptive pricing and promotion management; E-Commerce business scenario building; dynamic marketing management; and business reporting (viewer category/profile purchasing viewing trends) and viewer management access when authorized by the Business Rules.

The SPS enables dynamic, adaptive content synchronized with video, such as special offers triggered by video events. The Store and Forward function for viewer orders helps alleviate and control transaction peaks, such as when an advertisement runs and a large number of clients respond with an order or inquiry. The Service Platform Suite also enables services to access viewer orders when the viewer/client is off line. The Service Platform Suite also enables viewer on-line catalog browsing; user profile management; content targeting according to profiling; and targeted Email, based on user profiles and categories. The Service Platform Suite provides functionality for billing, payment processing and clearing; and encryption and security. The components comprising the SPS and how they interact to manage the interactive television environment in a preferred embodiment will now be described in more detail.

As shown in FIG. 4, the Service Manager 238 enables the NO to control and administer the services offered by the service providers. In particular, the Service Manager 238 enables the NO to register services, initiate services, manage services, and terminate services. The Service Manager 2386 schedules and provides access to bandwidth (broad cast and point-to-point) occupied by the services. The Service Manager 238 caches, hosts and manages service provided content and monitor services for billing purposes.

The Service Manager 238 interacts with Broadcast, Content Filter, and Platform Business Agents parameters 226. The Service Manager 238 performs Service Control (service start and stop) for multiple network multiplexes and headends. The Service Manager 238 manages Content Providers for security control and implementation of service provider contracts in the form of creation and enforcement of business rules for viewer transactions and controlling access to viewer/client information. The Service Manager 238 also provides Broadcast Scheduling, Bandwidth Management, and Content Management comprising service/client versioning, self-service service registration, commissioning and deployment of workflow, Content Provider Billing and reconciliation.

As shown in FIG. 4, the Transaction Manager 242 logs and manages transactions in the Transaction Database. These transactions range from purchases and advertisement responses, to service content requests. The Transaction Manager 242 enables network operators to track, query, and modify the transaction database to respond to customer requests regarding transactions. The Transaction Manager 242 also enables the NO to bill the service providers for the amount of transactions happening between the services and the NO subscriber client base. Transaction Manager 242 interacts with external payment services to perform monetary transactions. Transaction Manager 242 also provides an interface to both external and internal commerce engines to provide access to viewer/client order information. Transaction Manager 242 enables orders to be cached in client devices for Store and Forward operations or Cached in the Transaction Manager 242 for batch processing.

The Transaction Manager 242 also performs Session Management via onetime, transaction-related session identifiers. The Transaction Manager 242 performs Asynchronous Transaction Handling and Transaction Storage which enables a scalable solution to Services. Such asynchronous batch processing eliminates the necessity of services having a transaction infrastructure for simple functions (e.g., polls and quizzes). The Transaction Manger 242 also performs Order Status Management comprising Order capture, Content Provider Updates, Viewer access applications, and messaging or URL links to the service provider. The Transaction Manager 242 also provides Affinity Schemes, Payment on dispatch, and Transaction Based Content Provider Billing.

As shown in FIG. 4, the Viewer Manager 252 manages subscriber/user registration 264, preference, and profile information 262. Viewer Manager 252 enables users to register and record personal information in a database. The personal information comprises viewing patterns, promotional preferences, personal, wallet and demographic information, etc. Based on this recorded information and the user's activities, the Viewer Manager 252 generates profile information to categorize the user and produce targeted services, content and advertisements to suit the users profile 262 and expected preferences and needs. The Viewer Manager 252 also performs centralized updating of service and viewer parameters.

The SPS enables network operators to control access to the viewer database and enable only those service providers who have a prior contract or agreement with the network operator to access privileged information (e.g., credit card numbers, viewer's actual name, home address, telephone number, social security number, physical address of client device, client device hardware identifier etc.). For distributed functions, that is, when the client has sufficient processing power and storage, the Viewer Manager 252 enables access to personal and profile information stored on the client devices and enables the client devices to select user-preferred content. Clients select user-preferred content via business filters in the client device (e.g., STB).

The Viewer Manager 252 provides Household/Subscriber/STB (or other client device) identification and authentication in support of the Service Gateway and Parental Control functions. The Viewer Manager 252 supports Multiple Viewer identification and Registration authentication at a single STB through nicknames and personal identification numbers. The viewer identifier preferably is derived from the client device identifier number(s). The Viewer Manager 252 performs household and individual viewer profiling through logging, generation, and matchmaking linked to observed cumulative TV viewing and purchasing habits. The Viewer Manager 252 supports distributed data capture and storage between the SPS and the STB, and supports bi-directional synchronization. The Viewer Manager 252 enables distributed profile usage between all SPS applications and provides synchronisation with an external SMS/CRM.

The Viewer Manager 252 enables multiple viewer registrations for a single STB or client device using abstract viewer identifiers comprising nickname, full name and PIN Storage in the STB or other client device. Business Agents 226 enforce transactional business rules for interaction between service providers and viewers. Based on business rules, which are defined by the network operators and based on agreements with the service providers, the Business Agents 226 control transactions and service provider access to user information. Business Agents 226 can include, replace and delete viewer information during a transaction.

Business Agents 226 create sessions between subscribers and service providers. Business Agents 226 control access to viewer information details and manipulate viewer information by inclusion, replacement and removal of viewer information presented to Service Providers. The Business Agents 226 provide default values and control access to user information. The Business Agents 226 also perform Transaction Logging, Messaging Logging, Load/Transaction Monitoring.

Account enables the NO not the retailer or service provider, to own a direct relations with its subscribers and viewers. The client is identified to a service provider by the session identifier generated by the SPS service gateway when a client signs on. The client hardware identifier, which would enable a service provider to identify a hardware device and contact the user directly, is not revealed to the service provider. A client hardware identifier is retrieved from the native transport level of the client device and stored in table for cross reference between session identifiers utilized during transactions between an SPS and the client hardware identifier. A viewer or subscriber registers once with the NO and their account information is stored in an Open TV Account database controlled by the NO. The viewer can access any retail services or service providers available on the SPS without providing his/her account information, because the NO already has the account information stored in SPS and can easily insert all necessary information into the transaction. A retailer, however, can only obtain client information through a business agreement with the NO granting access to particular information.

Commercial transactions that occur through the use of the interactive television set are referred to herein as television commerce or T-commerce. An example, a T-commerce transaction processed under a preferred embodiment of Account can be described as follows: 1) A client device user registers with an account by providing names, addresses, and e-wallet information discussed above. The client also chooses a user name and a PIN, to be used later for authentication purposes; 2) A hardware identification may also be used during authentication; 3) The client interacts with a T-commerce application or service provider by adding products to a shopping cart. The client enters his/her user name and PIN to check out; 4) the T-commerce application connects to the Account function of the present invention. Account, which uses a client identifier and the user name to uniquely identify the viewer inside its database. The PIN is used to authenticate the viewer; 5) the T-commerce application sends the shopping cart information through the account to the retailer of service provider. The account inserts client information into the transaction to enable the retailer or service provider to identify the client and to receive essential client information such as credit card number and shipping address; 6) The T-commerce retailer or service provider receives the order, performs shipping and handling costs, tax and total cost calculation and sends the result back to the client; 7) the client reviews the cost information and confirms the order and the retailer sends a confirmation number back to the client; 8) for every transaction, the account inserts a transaction ID to track all the messages which belong to the same transaction session; 9) Account also provides different types of logging capability to assist the NO for customer service and data mining; 10) In addition, e-receipt information such as order description and order cost is required to be sent by either the retailer or the T-commerce application, so that Account provides an e-receipt record for future customer inquiries and transaction records.

Keywords facilitate data interchange during an E-commerce or other type of transaction. Transactions are completed through passing of and action upon these keywords. Keywords perform many functions comprising writing data into a data repository, logging data, swapping a keyword with its data parameter or value, creating a value for a keyword, deleting contents of a data repository, and patching a keyword with its actual value. Patching occurs when a keyword is replaced in a line with a corresponding value from a data repository. Keywords enable client authentication and identification, updating a database, logging transactions, tracking sessions, and sending error messages.

As an example, a generalized keyword has the form _O_<keyword_name>(param1, param2, . . . paramN), where the keyword_name specifies the function of the keyword and the last letter of the keyword_name is one of the letters P, R, S, C, W, or D, and represents the corresponding actions Patch, Remove, Swap, Create, Write, or Delete. The param can be textual content or can be a number representing a sequence value in a list. A blank value for param represents a first, or default, value. For example, the keyword_O_vBlnP( ) requests a patch of the last name of the person billed for a purchase. Upon receiving this keyword, Account patches, for example, the line MyShop_BilltoLast Name=_O_vBlnP( ) to become MyShop_BilltoLast Name=Smith, where Smith is the first in a list of billing last names in the client profile within the data repository. Keywords relating to a purchase item comprise tags that are used toward an electronic receipt. Some examples of tags are Order cost, Order currency, Order descriptions, Order status, and Order status URL.

The present invention provides server-side keywords for account transactions therein providing support for a Viewer Address Book, e-Wallet keywords, e-receipt keywords, e-receipt transaction keywords, and error keywords and other SPS functions.

The Viewer Address Book feature enables a viewer to register his/her friend's names and addresses into the Open TV Account data repository. Any authorized application can inquire into a viewer's address book from the Open TV Account and use that information for transaction purposes. For example, a T-commerce application may enable a viewer to pick an entry from his/her address book and send the purchased items to this address. The e-Wallet functions enables the viewer to store multiple credit card numbers as well as billing information in the Open TV Account data repository. E-receipt keywords are used by Account for logging the details of a transaction. The data is used later for customer service and billing purpose.

The NO associates a keyword with a unique transaction ID, generated by Account, to track transaction sessions uniformly across all retailers and all client devices known to the SPS. When Account encounters an error, such as an incorrect authorization code, it sends an HTTP response to the client to signal the error and the corresponding action. Since Account works with multi-platform clients simultaneously, the actual error response is a configured parameter in Account, enabling Account to send an error response in HTML, XML, or even name-value format to the client.

Transactions are based on HTML name value pairs, and are issued using HTTP for easy integration with existing Internet application servers. The use of HTTP is achieved either directly from the set-top box using an embedded HTTP communication stack or via the Service Gateway and the client device compatible transport communication protocol, DATP.

The Transaction Gadget Kit is provided that comprises a series of transaction gadgets. A gadget is a function or method that executes on the SPS. A set of gadgets are provided and additional gadgets can be created and specified by the service providers, clients and the NO. A Table gadget, for example, provides in-memory storage and management for a rectangular table viewed as a sequence of records (or rows) storing a set of named columns. The Table gadget works in conjunction with the Table Presentation gadget. The Table Presentation gadget is dedicated to the presentation of a subset of the columns and rows of a Table gadget content. Exchanges to or from the table are performed one record at a time via a set of smart variables whose names match the column names. Refresh of any linked Table Presentation gadget is automatically triggered whenever the Table content is updated. Support is also provided to load/save the whole table at once to and from a smart variable.

SmartVariable gadget enables access to a smart variable. Smart variables enable the SPS applications to store values but also to trigger functionality based on those values. For example, a smart variable can hold the quantity a viewer has specified when making a purchase. This value can be accessed when creating a transaction order, but is also to be used to update an on-screen display of the quantity. Smart variables can hold both numeric and textual values. Numeric values can be integers, floats, and numeric expressions. A SmartListener gadget monitors updates of a set of smart variables. If one of the smart variables changes, then a handler will be triggered. An HTTPRequest gadget provides the ability to format and submit a HTTP request to a remote HTTP server. This can be via the EN2 HTTP extension or via the service gateway using DATP. A QueryString gadget formats and parses URL encoded query strings (name value pairs). The contents of a query string can either be formatted or exploded from/into a set of smart variables.

A SmartEval gadget re-evaluates an arithmetic expression whenever one of its smart variable operands changes. SmartCompare gadget monitors a smart variable and compares its value to a constant value whenever changed. One of two handlers will be invoked depending on the result of the comparison. The comparison can be greater than, less than, equal, not equal to, etc. The handlers are called based on whether the comparison is true or false. The PINChecker gadget provides an interface for conditional access (CA) PIN checking. In a preferred embodiment, it integrates with an embedded CA parental control PIN. The result of the check is placed in a smart variable. A CreditCardChecker performs checks on credit card information within the set-top box. The result of the check is placed in a smart variable.

TextInput gadget supports input of text from a set-top box remote control or infrared keyboard. The input is placed in a smart variable. A Dynamic Text gadget provides dynamic caption tracking of the value of a smart variable. This gadget provides dynamic update of the text displayed within a set-top box. A SmartLanguage gadget provides an interface for determining the language that should be used by an application.

DATP gadget is a library that supports access to the service gateway using DATP. DATPLink gadget is a link to the service gateway DATP library. The state of the connection is held in a smart variable.

StationControl gadget supports control of the video and audio streams and switching to a new service. A ShapeAnim gadget provides animation of basic shapes and bitmaps.

A purchase transaction begins when a client sends a message to the server comprising session identifier associated with a cookie and keywords for the purchase. The SPS associates session identifiers and cookies in a cookie to session ID table. The order message is sent by the set-top box application to the content provider, the SPS intercepts the message, patches viewer details to the messages by replacing placeholders within the order parameters (i.e. providing credit card number), logs the order details and forwards the message to the content provider application server. The application server processes the order and returns the confirmation to the set-top box. The SPS intercepts the response, updates the order log to reflect the confirmation and forwards it to the set-top box. In reality, commercial transactions of this type are likely to be more complicated and involve more messages between the set-top box application and the application server. The SPS is able to monitor the state of the order over multiple exchanges. The set-top box application may fetch some information directly from the service platform manager such as payment card details from the SPS e-wallet.

As an option, the client can purchase directly from the service provider. However, purchasing through the Account server enables the client to provide minimal information at the moment of purchase and if the STB is operating in a single user mode, a viewer is already logged on and does not need to identify himself. In a multi-user mode (as in a family with many viewers), the viewer logs on to the system in order to correctly identify himself. The present invention's use of keywords speeds the transaction and enables a transparency to the transaction from the client's perspective and from the service provider's perspective, such that the viewer does not need to visit another site to, for example, retrieve credit card information, or to conclude a purchase as in for example, Microsoft Passport. This client information is transparently provided by the keywords, that is, the user is unaware of the interaction.

Figure 9:
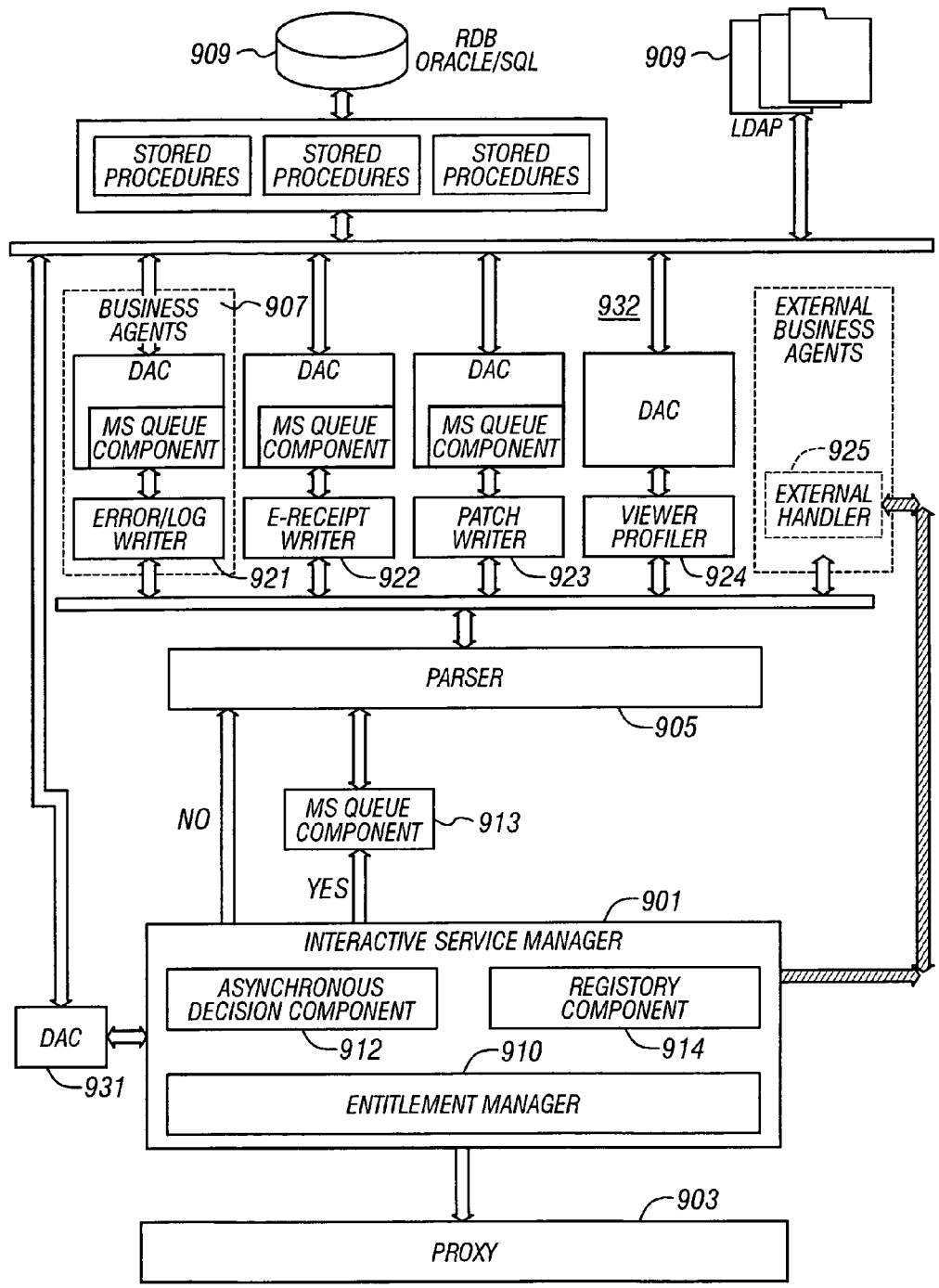
FIG. 9 illustrates a diagram of the architecture for Account.

A high-level diagram of the account is illustrated in FIG. 9. Account comprises five major components: Interactive Service Manager (ISM) (901), Proxy component (903), Parser (905), Business Agents (907), and one or more Data Repositories (909), such as Relational Database, LDAP, Activer Directory, etc. ISM enables the NO to do several things. The NO can set the level of accessibility to client data of each interactive service provider. Secondly, the NO can set the level of patching of client data for each service to enable patching-type billing, or billing by review of the patch history. Third the NO can capture e-receipts for each service to enable e-receipt billing. Fourth, the NO can set the level of logging for each service to enable the client data to be used for customer relation purposes. Fifth, the NO can also set the asynchronous requirements for store and forward messaging for each service. Sixth, the NO can set the authentication requirements for each service.

Account provides different types of logging for both transaction management purposes and to enable a billing structure with expanded capabilities. Additional logging types, such as e-receipt logging and patch logging, provide the NO options on charging service providers. E-receipt logging logs the transaction variables, including tags (i.e. order description), whenever they appear in the message to enable a service provider to be billed according to the transaction outcome (e.g., the purchase of a TV set). In Patch Logging, the account logs the occurrences of each patching for each service provider to enable billing of a service provider according to the types and numbers of patches that have occurred for the service.

Asynchronous messaging capabilities (such as Store and Forward) enable tasks that do not need synchronous response (e.g. logging into a database) to be performed asynchronously to reduce peak message transfer load. In doing this, asynchronous messaging improves message processing time by storing transaction messages for transmission later.

Business Agents are provided in two separate components: Data Access Components (DAC) and Business Logic. Business Logic handles specific business requirements, i.e., handling client records, while DAC is dedicated to accessing data repositories. Also, flexible Business Agent architecture enable external Business Agents to be added easily. As an example, a NO creates and provides their own tags and keywords and easily enables a Business Agent to handle those tags and keywords.

A high level description of the functions of Account follows. The Proxy component (903) receives a HTTP request from a client. This request comprises cookies and keywords for a transaction. For each request, the Proxy component packages the requests into a buffer object and passes it to the ISM. The ISM first calls Entitlement Manager (EM) (910) to verify the permission of the source and destination. Then, the ISM determines whether the request is synchronous or asynchronous from the OTVFlag Field in the header cookie/session identifier of the message. If the request is synchronous, the ISM sends the request to the Parser (905) directly. If the request is asynchronous, the ISM puts the request into a MS Queue Components (QC) (913) for asynchronous processing and sends a pre-generated response back to the client. The Parser thus either receives the request through a synchronous call or through the Queue Components Player. The Parser also receives a table which contains the permitted tags and the "Business Agent" COM objects which can handle those tags. Whenever the ISM encounters one of the tags, it calls the appropriate "Business Agent" COM object to perform the actual function. There are a number of built-in "Business Agents" to perform critical functions such as Log Writer (921), E-receipt Writer (922), Patch Writer (923), Viewer Profiler (924), and Error Handler. An External Business Agent (925) can be added by registering itself and any new "tags" it can handle with the ISM. Each Business Agent calls its corresponding Data Access Component (DAC) to talk to the appropriate Data Sources.

The Proxy Component is implemented as two parts: the IIS filter and the IIS extension. IIS filter is called whenever a request is issued from a client to the proxy. The URL is then patched by the IIS filter to call the IIS extension. The IIS Extension recreates the request, stores the request in a buffer, packages the buffer into a COM interface, and passes it to the ISM which implements the interface.

The ISM accesses a list of all the active applications. It also has access to a black list of the subscribers which are prohibited from subscribing to any SPS service, as well as Default Logging level and E-receipt logging level. For each service registered with the SPS, ISM provides the following service specific data: Service ID, status (active or non-active), list of domain names associated with the service provider, permitted keywords associated with the service provider, default languages associated with the service provider, billing requirements (patching billing or e-receipt), and logging levels.

The ISM comprises the following components: EM (910), Asynchronous Decision Component (912), and Registry component (914). The EM (910) is the first component that processes the request/response. Entitlement Manager functions like a gatekeeper to determine whether a source is entitled to send the message and whether the destination is entitled to receive the message. It makes use of the following information to either accept or reject the message: a list of all the active services, critical info associated with each service (i.e. status, domain name, permitted keywords, etc.), and a black list of subscribers.

The Asynchronous Decision Component (ADC) (912) of the ISM, based on the status of an OTVFlag field in the session identifier/cookie header of the incoming HTTP request, determines whether the request is queued or not. If the request is synchronous, the ADC calls the Parser directly. If the request is asynchronous, it will place the request into a MS Queue Component (QC) and return a response to the client to notify the success or failure of placing the request into the QC.

Registry Component comprises an adopted registration scheme enabling a Business Agent to register itself with the ISM. The registration information comprises the name of the Business Agent and its ProgID name, and the keywords that the Business Agent can handle. In a preferred embodiment, a Business Agent is implemented as follows: in the initialization phase of the ISM, the Business Agent needs to create an instance of each of the Business Agent's COM objects. During this creation phase, the ISM can inquire the set of keywords that each Business Agent can handle. The ISM then stores the information into a table and passes this information to the Parser.

Parser (905) is the central component to parse and modify a message. Parser receives the following information from the ISM: a set of permitted keywords and for each keyword, the Business Agent COM object which can handle the keyword, and the logging level for Log Writer and E-receipt Writer. The Parser parses the message for the keywords and calls the corresponding Business Agent to handle the keyword. As mentioned, parser receives synchronous messages through synchronous function calls or asynchronous messages through the QC player. Once the parser begins processing the message it treats the message as if it was received synchronously and performs all the action at once. For any asynchronous message, the Parser first processes the message for the keywords, then sends the message through HTTP to its URL without returning to the Proxy because the original connection in the Proxy has been closed due to the pre-generated response to the client. So the Parser sends the message without relying on the Proxy.

Each Business Agent is an individual component to handle a specific business function. Open TV Account has a set of built-in Business Agents to handle functions like logging, viewer profiling, error handling, etc. A NO is enabled to plug in External Business Agents to handle specific message keywords and the corresponding business functions that it defines.

Each Business Agent is divided into two separate components: Business Logic and Data Access Component (DAC). DAC is a component inside a Business Agent to write-retrieve data to/from the Data Repository on behalf of the Business Agent. The concept of separating the data access portion into a dedicated DAC is to enable the account to easily adapt to work with different schema and different number and type of Data Repositories. There are two DACs for Account. One is the ISM DAC (931) and the other one is the Viewer Profiler DAC (932). The ISM DAC is responsible for interfacing with ISM and all the Business Agents except Viewer Profiler. The Viewer DAC is responsible for interfacing with Viewer Profiler BA only. Separate DACs enable for an exposed Viewer DAC API, so that a different Viewer Profiler DAC can be easily swapped in to work with a different Viewer data repository, such as LDAP.

The Log Writer component supports four levels of logging and logs according to the level set in the ISM. There is also a global Logging Level that can be set by the SPS but the Service Level Logging takes precedence over the global Logging Levels. The Log Writer is implemented asynchronously using MS QC to reduce the waiting time of writing to the database. Caution should be used to prevent logging from happening too early. For example, a Transaction ID should be generated before Logging occurs.

The E-Receipt Writer component is responsible for logging the client order tags into the database. These order tags are used as an electronic receipt (order summary) for both the service and the client. The NO can use this information to bill a service according to the amount recorded in the e-receipt, provide customer service support to answer order inquires from the subscribers, and generate an order history for each subscriber. In a preferred embodiment, E-Receipt Writer is implemented using MS QC to reduce waiting time.

Patch Writer is responsible for logging the patching that occurs for each message, for example, when patching a credit card number into a transaction message. Patch Writer enables the NO to bill a service according to the amount and type of patching that have occurred for that service. Input for Patch Writer are all tags that have been patched along with cookie information. In a preferred embodiment, this is implemented using MS QC as an asynchronous component.

Error Writer is responsible for logging error situations into the database. An error occurs for at least one of: Source or Destination entitlement failure, Viewer authentication failure, Request patching on non-permitted tags, and HTTP errors. In a preferred embodiment, Error Writer is implemented using MS QC as an asynchronous component.

Viewer Profiler is responsible for reading/writing viewer profile information comprising viewer address information, viewer e-wallet information, viewer contact list information, and viewer order history based on the transaction variables. In the beginning of processing a message, Viewer Profiler reads the viewer record into its cache. At the end of the processing, Viewer Profile releases the cache.

No Business Agents retain any state information from message to message. Business Agents are all stateless components, which are preferably to be initialized with the message parameters in the beginning of a message.

Open TV Account is engineered to enable a NO to add his/her own tags and the corresponding Business Agents to handle those keywords that may be used by the NO for his/her own business functions. For example, a NO may require a special keyword to be included in any transaction that results from an advertisement through a TV commercial. To be plugged into Account, an external Business Agent must register itself to the ISM. Registration requires adding the Business Agents COM (ProgID) into the registry of the ISM COM object. When the ISM initializes, it creates an instance of each of the Business Agent COM object that it needs to interface with. It then inquires at each Business Agent COM object what keywords the COM object can handle and stores the mapping between the keywords and the Business Agent COM into a table (Keyword Handling Table). The ISM passes the message, the permitted tags for the service and the Keyword Handling Table to the Parser. When the Parser encounters a keyword, it calls the corresponding business Agent COM object according to the Keyword Handling Table. This also enables a keyword to be handled by multiple Business Agent COM objects and the objects are called in the order that the Business Agents registered into the ISM registry.

Account enables a NO to increase revenue per subscriber by keeping tight control of its subscriber's information, and to record various logs enabling different type of billing for individual service and for its customer relationship management. These logs can also be used for data mining purpose.

The Advertising Manager (AM) enables NO to control the content and schedules of the advertisements being delivered to the viewers. The AM provides a matchmaker component to enable network operators to set up advertising campaign rules to target different advertisements from different services. The AM also targets users with different profiles. The AM tracks user responses to the advertisements, generates reports and creates new campaign rules based on the reports. Thus, the SPS enables the provision of adaptive advertising based on feed back from client/user responses, time of day, available programming, available advertising, available advertising space, viewer preferences and profiles. The AM provides an interface with both the broadcast and point-to-point links, which enables complimentary advertising interaction between the two delivery channels. For example, a broadcast (push) advertisement can trigger a point-to-point connection to the advertising service via the SPS so that the user can buy the product or get more information related to the product. A broadcast advertisement can also be placed in the point-to-point content to inform a user of the availability of broadcast services (e.g., an infomercial).

The AM provides the NO with administration of advertising inventory and advertisement assets. The inventory will be limited to a set of standard sizes and standard media types—stills (bmp, jpeg, or mpeg), animation, sounds, and links. The AM also performs Advertisement Impression Tracking; impression tracking may be actual, sampled or estimated depending on the network infrastructure; impression details may be obtained via STB polling or piggybacking. The AM performs STB capture, store and forward, server handling, and storing and reporting. Impression tracking, polling and view counts are considered as feed back in adaptive advertising.

The AM performs user Click Tracking; and Self Service Advertising definition/Advertising Sales comprising size, content, category, and automatic size checking/detection and usage restrictions such as service, time of day, day of week, and advertising period. The AM performs Automated/Self Service Advertising Spot/Space definition; page tagging by service and type, and by category. The AM performs STB-based matchmaking, Server based/Broadcast matchmaking and redirection of advertising over the most point-to-point or broadcast for time sensitive advertising serving/matching, head end location and service.

The AM performs Broadcast Advertisement serving to online content and controls micro-site scheduling with a link to Service Manager. Broadcast Carousels are generated by the SPS using Service Manager, H2O, Carousel Manager and Open Streamer. The generation of the carousels are guided by the service rules in the Service Manager database, by product updates triggered by the merchants and by an event scheduler. The viewer profile and categories are used to select products and advertising to be presented to the viewer/client. In some instances, several products or advertising segments (ads) are broadcast to the viewer or client (pushed, i.e., sent without a request from the viewer) to the STB or client. Business filters associated with the viewer, preferably located in a smart STB (e.g., Motorola DCT 5000) are used to select the best ad for the viewer. For example, during a cooking show, the SPS may schedule a group of cooking advertisements for broadcast to viewers. This group of advertisements may comprise cooking ads on Italian, French, Indian and German cuisine. The business filter associated with or located in the STB or client will select with type of cuisine advertisement to present to the client or viewer. One viewer may see a French cooking advertisement while another viewer may see the Indian cooking advertisement.

Advertising Campaign management makes use of viewer data mining and analytic systems in order to propose the best selection of products, advertisements and timing for broadcast. The SPS provides rule based systems to create 'smart' advertising campaigns. The campaigns are adaptive based on user preferences, profiles, buying and viewing habits, and demographics. Based on information coming from the Advertisement Content database, Campaign Rules database, Service Manager, and Carousel Manager, the AM decides the best products to present to the viewer. It triggers the Carousel Manager to rebuild the broadcast catalog. The AM also interfaces with the Business Agents to propose advertising contents presented to the viewer while the viewer is on line.

The present invention provides targeting technology to present the right product depending on user basic profile, type of goods, and context (page, time). The present invention also provides 'prediction' technology for analysing previous orders/requests to guess what the viewer might be interested in. Those technologies use a mixture of statistics and rule based system for intelligent 'guessing'.

The SPS enables reuse of Web Commerce infrastructure. The SPS replaces the 'usual' HTML templates with TV friendly format. The Business Agents receive the order requests from the STB or client through the Service Gateway. As the Service Gateway queues messages (to manage peaks), some orders might be received by the Business Agents with a delay (preferably orders that do not need any form of confirmation would use this scheme). The Business Agents add viewer information to orders. The amount and type of the viewer information provided in a order/message is guided by business rules depending on the service/retail agreement. As communications are exchanges between services and viewers/clients the information will be sent to either separate carousels with a single carousel per transport streams or merged into the existing application carousels.

Orders then may proceed, if desired through a 'credit card clearance' function provided by the SPS. As confirmations are sent back from the retailers, the orders are sent real-time back to the user; sent via Email to the user; or made available on-demand through some form of customer care application.

The SPS provides Offline Viewer Identification, which enables a viewer to be identified or authenticated without the need for an online viewer connection to be established. This ensures that the connection delay (e.g., 10-40 seconds) can be placed at the most appropriate place within the purchase process. This also enables viewer identification within Store and Forward situations. This function enables communications and completion of orders/operations with an STB or other client device that is intermittently on and off.

The Offline Order Form function enables the SPS to provide T-Commerce services for a viewer to be able to add items to an order form (shopping cart) without being online. The Store and Forward function is important for achieving greater scalability. Store and Forward may be either forwarding in off peak hours or simply spreading the load over a given time period after a transaction has been initiated. The full Store and Forward solution is integrated with the "Navigator", EPG or Control Task so that responses can be forwarded from any channel at any time. Store and Forward can be used for enhanced E-Commerce, T-Commerce transactions. The offline viewer authentication enables offline payment selection. Offline payment selection is provided by the Service Platform Suite to improve the purchase process and to enable use of the Store and Forward function with T-Commerce/E-Commerce.

Advertisement tools traverse all SPS applications. Every SPS application is able to offer advertisement space and banners. The AM provides a central registration point for all applications to enable access to advertisement feeds for all applications. From the advertisement manager's operator point of view, the AM enables associated images, and links to services (applications, TV channels), mini-sites, to schedule the advertisement and report them for audit.

The AM enables advertisers to create campaigns tailored to specific viewer groups or programs and to watch the results through HTML tools. The repository component saves/manages the advertising campaign (rules, schedules, properties and assets). The Campaign Manager prepares the advertisements to be sent. The Campaign Manager provides rules associated with campaign and feedback from the reporting to decide which advertisements are sent to which viewer and when.

The 'Delivery' component sends the campaign of advertisement chosen by the campaign manager using Open Streamer broadcast or a point-to-point communication link. Open Streamer packages advertisements as N Service Platform carousels, one per transport stream, optimizing the bandwidth usage. STB client applications are broadcast with an advertisement library. This library performs Campaign acquisition, Matchmaking, Tracking and Reporting. The campaign acquisition client component runs in parallel with the client application, watching for the campaign carousel, caching information, and pre-fetching assets. The matchmaking client components evaluate each advertising campaign with local parameters (type of page displayed, user information, number of times campaign was ran, etc.) and accesses the best advertisements for display.

Advertise supports viewer tracking capabilities (Measure) and viewer profiling (Target), adjusting subsequent future deliveries of advertisements based on actual impressions, HTML support, targeting of advertisement by date and time, and extension to support spot-on solutions for video advertisements.

Figure 6:
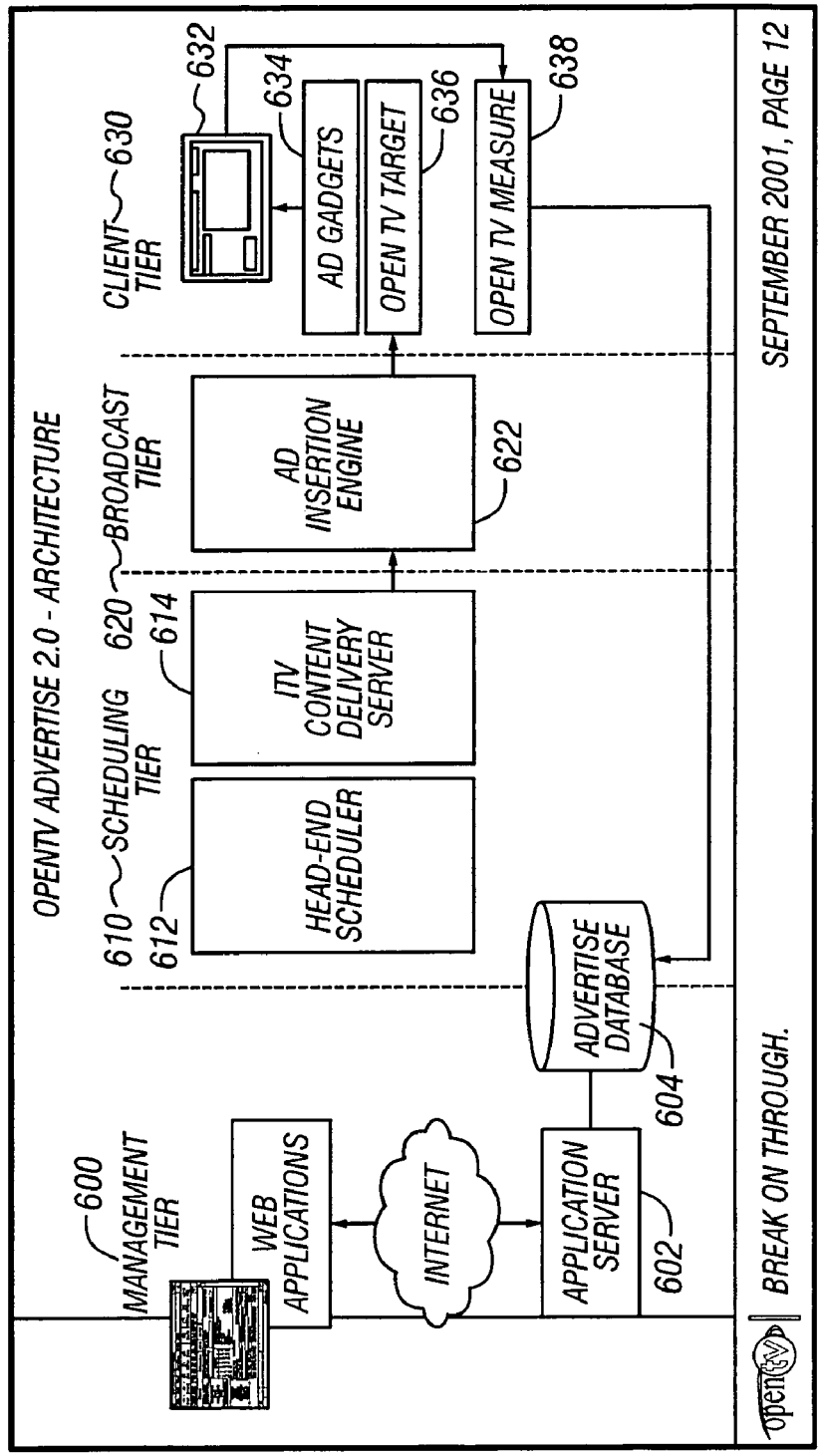
FIG. 6 illustrates a diagram of the Advertise architecture.

An illustration of the Advertise Architecture is shown in FIG. 6. Advertise operates across four tiers of a broadcast platform. A first tier is referred to herein as a Management Tier (600) and comprises a Web Application Server (602). The Web Application Server (602) stores information received from the sales representatives from different advertisement entities (advertisement agencies, Coca-Cola, P&G, etc.) into an Advertise Database (604). All users (administrators, advertisement sales people, ad operation staff, etc.) access the system by web GUI applications over secure sessions. The Web Application Server provides a web-based interface for media sales representatives and comprises a Campaign Planning Module, an Inventory Forecasting Module, an Ad Catalog Module, a Reporting Module, a Billing Module, a Sales Cycle Management Module, and a Security Module. The Campaign Planning Module structures and manages campaigns in order to target advertising banners with specific interactive applications. The Inventory Forecasting Module gives a quick and accurate snapshot of available inventory of advertisements, projected campaign delivery, schedules and progress. The Ad Catalog Module views, manages and stores thousands of banner ads, together with contacts and names of agencies and advertisers. The Reporting Module enables reports to be generated in real-time for general campaign delivery status and performance reviews. The Billing Module integrates easily with existing billing systems to facilitate a turnkey integration and to ensure minimal interruption to the existing operator architecture. The Sales Cycle Management Module helps operator media sales representatives to view inventory, enter insertion orders, and speed the sales cycle. The Security Module establishes varying levels of security and access as well as specific permission rights for all users (advertisers/agencies, advertisement operators, traffic & billing, advertisement sales, etc.) of the system.

A second tier is referred to herein as the Scheduling tier (610) and comprises a Head End Scheduler (HES) (612) and an ITV Content Delivery Server (614). The HES schedules banner advertisements to fill advertisement space/bandwidth available, ensuring required impressions are reached from the targeted applications while adhering to the campaign rules. The advertisement available information, information on the number of subscribers watching in a specific time frame, and sold advertising spots are all fed into the HES (612), which creates a high level delivery plan stored in the Advertise Database (604). When queried for what ads to display next, the Real Time Server of the iTV Content Delivery Server (614) reads the delivery plan on the Advertise Database and returns a list of advertisements for the application to display next. Advertisements are chosen based on constraints such as advertisement priority, advertisement weight, minimum advertisement display time, backfill Boolean, intra-spot-session frequency cap, intra-application-session frequency cap, industry exclusions, overall frequency cap, minimum rotation interval, advertisement spec, advertisement type, and advertisement target. An advertisement of higher priority will always be displayed before one with a lower priority, advertisement weight enable advertisements within the same priority level to be displayed based on a random number and a bias based on weight. As an example of advertisement weight, ad #4 has a weight of 0.9 and ad #5 has a weight of 0.1. Therefore, the Scheduler will order #4 ahead of #5 90% of the time; and order #5 ahead of #4 10% of the time.

Backfill Boolean identifies the advertisement as low value and only to be used when no other ads are in the queue. Frequency caps limit the number of advertisement displays. The intra-spot-session frequency cap limits the number of times an advertisement can be displayed within a particular spot. The intra-application-session frequency cap limits the number of times an advertisement can be displayed while the current application is running. The overall frequency cap limits the number of times an advertisement can be displayed across all applications and all launches of a particular application. Some applications have an industry type to keep certain ad types out. Industry exclusions enable, for example, a Domino's application to display auto advertisements, but not fast food advertisements. Minimum advertisement display time sets a minimum amount of time that an ad should be displayed. The minimum-rotation-interval sets a minimum of ads that must be displayed before this ad is eligible for redisplay within the same spot. Advertisement Spec and Advertisement Type match compatibility of the advertisement with the size and the format (MPEG, jpeg, etc.) of the application. Advertisement Target matches, for example, demographics of the advertisement.

A third tier is referred to herein as the Broadcast tier (620) and comprises an Advertisement Insertion Engine (622). The Advertisement Insertion Engine requests advertisements, for example, banner ads from the iTV Content Delivery Server (614) and inserts advertisements into a broadcast stream of advertisement-enabled applications. The advertisement can be any form such as video or audio insert into or replace any currently displayed image or active audio track. An advertisement is sent from the Ad Insertion Engine (622) to the Carousel Manager, and the advertisement is then broadcast by necessary medium (satellite, transmitter, cable, etc.) to be received by the client, e.g. a set top box. The advertisement is then displayed and viewed by the client. Advertisements are requested regularly to provide rotation at the required frequency. The advertisement delivery component is independent from the advertisement server component to enable flexible migration to a future HTML-compliant ad delivery module.

We now describe the data flow of an advertisement cycle. At the Management tier, a sales agent uses the advertisement operations section web interface to enter information on the advertisement, target application, date range, and the number of desired impressions. Each targeting attempt triggers the Head End Scheduler (612) to run a quick simulation of available space versus requested impressions to see if the required impression can be fulfilled. Upon success, a set of campaign related records are created in the reserved state until business agreements are verified, at which point the status is changed to active. The attachment file is uploaded from the advertiser operator's personal computer to the content server. Scheduler runs periodically and assigns priorities and weights to advertisements. The Scheduler implements a set of highly optimized and extremely complex scheduling algorithms to ensure the best possible attempt at ensuring accurate and smooth delivery of advertising campaigns. A delivery plan is written for each advertisement. The advertisement insertion engine sends an XML-coded ad group request via HTTP to the Content Delivery Server (614) when it is time to rotate an advertisement group. The advertisement insertion engine uses the ad meta data in the ad group response to get the ads from the content server and then reformats them for inclusion into the flow file of the application. When the Content Delivery Server includes an ad in an ad group response for a specific available, it writes a record into the database indicating an advertisement broadcast.

A positive response to the banner advertisement or at the user's request might trigger a partial or whole replacement of the currently executing image/audio data, for a "commercial". Ad Gadget enables insertion of imagery and audio data currently being displayed and/or heard at a client device. A fourth tier is referred to herein as the Client Tier (630) and comprises an Ad Gadget Kit (634), Target (636), and Measure (638). Advertisements are sent to Target, which selects advertisements that match a viewer profile residing on the client STB. Selected advertisements are transferred to the Ad Gadget Kit, and displayed to the viewer. The Ad Gadget Kit enables applications to display a rotation of advertisements with click-through capabilities. The viewer may interact with the advertisement by clicking on an item in the advertisement. Measure (638) samples viewer activity for items of interest to advertisers, i.e. click-through rate (the rate a viewer proactively responds to an advertisement impression), purchase rate, and impression counting, which assess the effectiveness of advertising. As shown in FIG. 6, results of Measure (638) are sent to the Advertisement Database (604).

Figure 7:
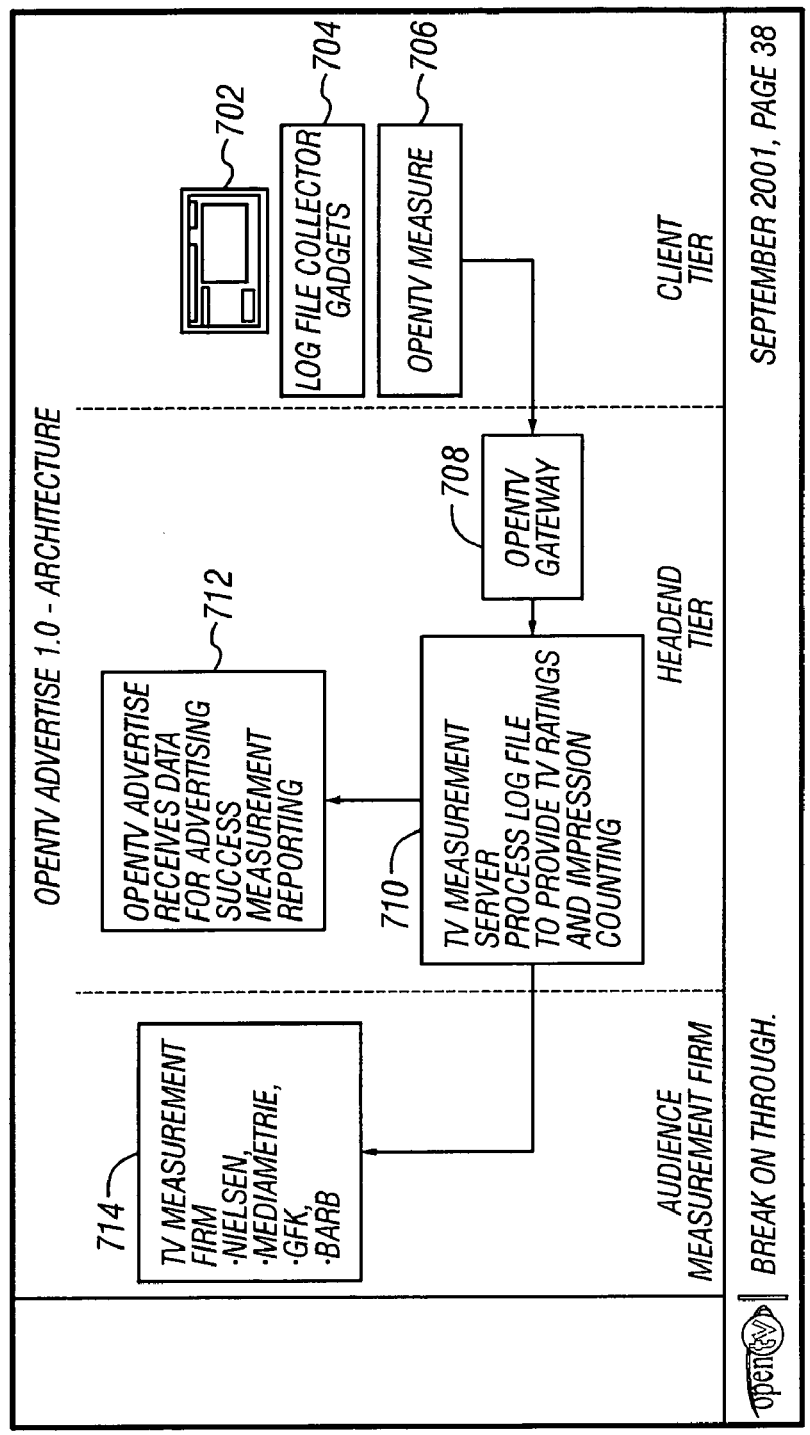
FIG. 7 illustrates a diagram of the architecture for Measure.

The architecture of the Measure is shown in FIG. 7. On the client side, Measure (706) runs on a client device, e.g. set top box, and compiles data from the Log File Collector Gadgets (704). The Log File Collector Gadgets collects raw zap data (what channels are being tuned in) and log data (what has been purchased). Data can be sampled in a sample model, where the STB chooses to record over a given time period, or on an absolute model. The log file can be pre-processed on the STB, but most of the processing is done on a server. Locally, data of the activity log is stored in a flash file system. Stored details are preferably compressed to reduce flash storage requirement. Different logging models have different flash file requirements. A forward library resides on the STB and is used as inclusion in a resident application to cause forwarding of activity log to the server. Forwarding comprises random elements to spread forwarding within a time window. Information is sent from the Measure function on the STB to the Service Gateway (708), which passes the data to a TV Measurement Server (710) on the Head End tier.

On the server side, activity logs are collected by an application server and stored in a database. Activity logs are stored in an uncompressed form to enable easy analysis and manipulation. An API to the database enables access to activity logs by third party systems (714), i.e. TV measurement firms. A range of basic reports provides analysis of the activity logs, taking into account the sample used and providing interpolated results. The percentage of STBs sampled can be as small as 1% and suitably represent the entire population. In a preferred embodiment of the invention, data is collected anonymously from the STBs. As another option, Measure and Profile are both deployed, enabling a household profile to be reported with the activity log. In a preferred embodiment, the methodology of processing and analysis of the log file is that used by TV measurement firms (e.g., Nielsen). Other process and analysis methods can be used. Processing occurs on the server in order to provide continuous TV ratings on TV programming and interactive applications. Continuously tracked data shows daily television viewership by television set, enabling clearer analysis of ratings for broadcast and cable television programs and interactive applications usage. Individual client response is stored in profile on the set-top box, and general populace viewing habits are stored at the Head End Server. A preferred embodiment of the invention uses commercial software from Predictive Networks.

Figure 8:
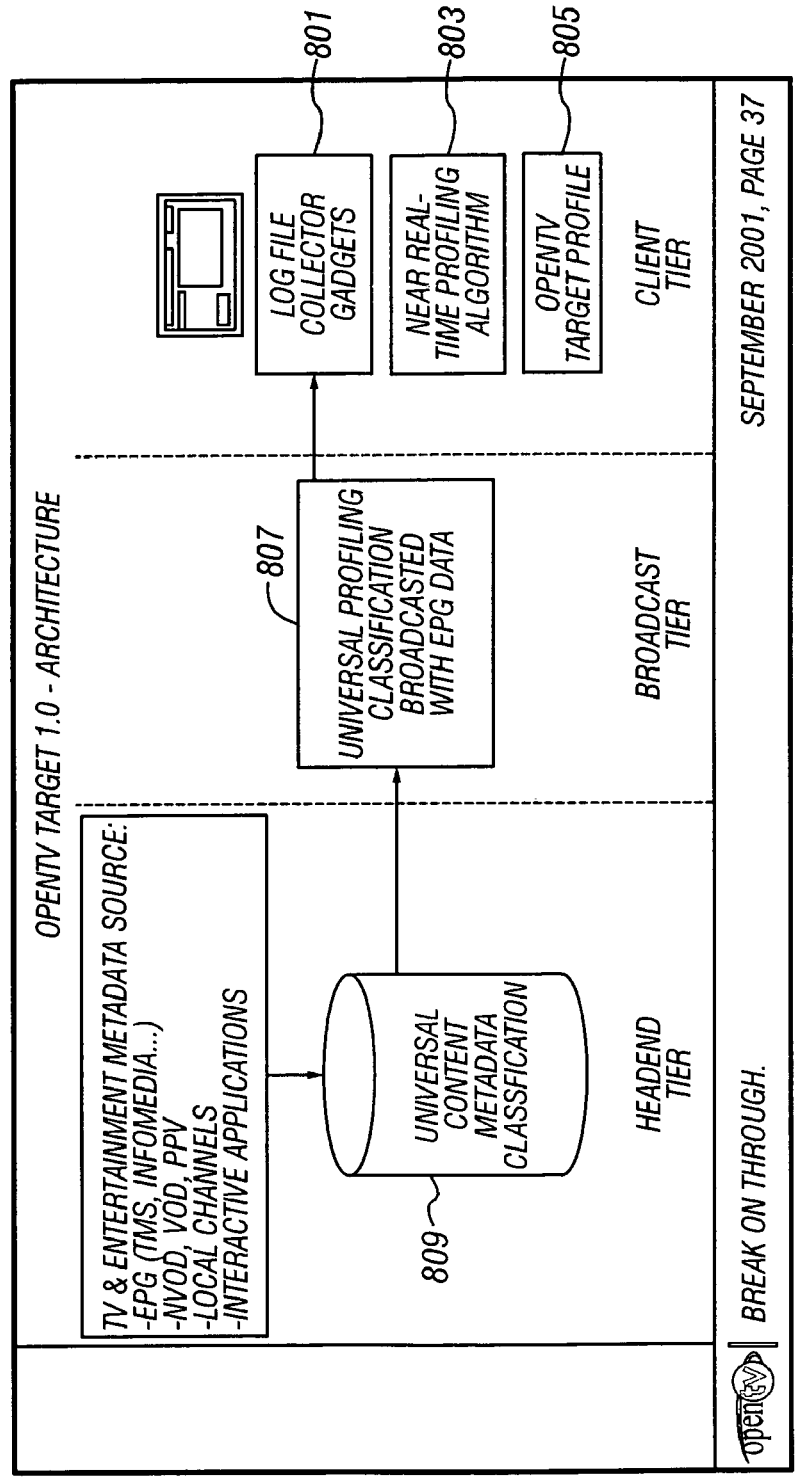
FIG. 8 illustrates a diagram of the architecture for Target.

FIG. 8 shows an architectural diagram of the Target. The Target is an STB-based software, the intent of which is to profile and target client viewers with advertisement. The Target operates across the Head End tier, the Broadcast tier, and the Client Tier. On the Head End, advertisements are categorized via a set of class schemes. TV and entertainment industry supply meta-data, as do local channels, EPG, and interactive applications. On the Broadcasting Tier, a 'universal' description of the advertisements is placed in the profile of the data.

Client Tier as shown in FIG. 8, provides a small resident profile (Target Profile) in the STB that acts as a filter for all incoming targeted ads or T-commerce initiatives arriving at the STB. The Client Tier comprises a Log File Collector Gadget (801) for activity capture and profile update, and a Gadget for real-time profiling (803), as well as the Target Profile (805). The nature of the resident profile depends on the technology used. In a preferred embodiment, using software from Predictive Networks, the profile is made up of approximately 140 variables. The Log File Collector Gadgets (801), residing on the client device, captures zap data (what channel is being tuned in) and log data (what has been purchased). The Collector Gadgets is used in common with the Measure (638) and the Target (636). A core-profiling algorithm (803) enables updating the Target Profile (805) according to Log File results in real time using the collected data. Profile resides entirely on the STB and filters incoming targeted advertisements or T-commerce initiatives. Having a profile reside on the local STB controls access to the profile. When a request for an advertisement is made, advertisement are selected from the broadcast stream according to matches between the Target profile and the 'universal' profile of the advertisement.

Figure 10:
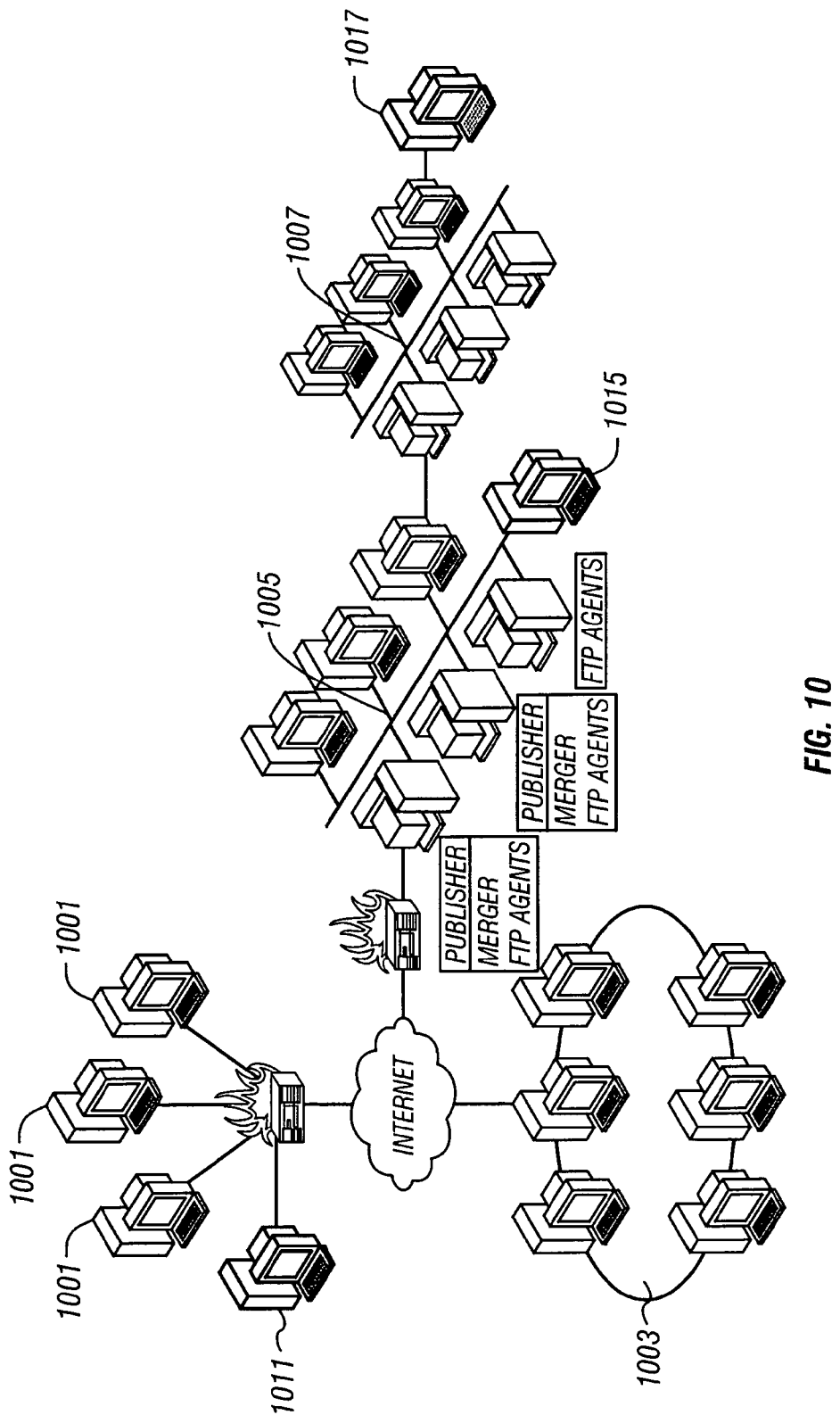
FIG. 10 shows a diagram of the architecture for Service Platform Manager.

Turning now to FIG. 10, the SPS comprises distributed method enabling an administrator to track the integrity and connectivity of one or more SPS systems, and data streams from external servers, timeliness of file data, etc. FIG. 10 shows a typical connection between external servers, SPS servers, broadcast equipment, and clients.

Service Providers 1001, with services such as Commerce 2K, FetchMail, FTP services, etc. connect through a firewall to the Internet. External Service Providers shown as 1003, include such services as AccuWeather, CableSoft, GIST, Reuters Etc. These services provide multiplexed files, data, and Instant Messenger services to the SPS and are also available via the Internet. Information from these Service Providers are sent to the Server Equipment 1005, which also interacts with clients via the broadcast equipment 1007.

The SPS works as a distributed computer system over several different tier levels and does not require a central database. Every service (e.g. Reuters) is responsible for its own status, schedule initialization files, configuration files, etc. Monitoring systems connect at the SPS service providers (1011), at the owner broadcast equipment (1015), and at the broadcast stream tier (1017). The outlined SPS alerts the NO when there is a hardware failure, when there is a data service failure (ftp/http/email, etc.), when a back channel has failed, when a scheduled data update fails, or when a schedule MUX update fails. A monitor connected to the external servers can monitor those files resident on the system, such as AccuWeather, Reuters, FetchMail, etc. The For broadcast services, SPM monitors items sent to the clients, such as weather, news, streams, as well as the Service Gateway and local applications such as Merger and FTP agents.

SPM monitors all the SPS streams. If any broadcast equipment fails, this monitor will flag it as a non-compliant or missing stream. The SPS also checks services to ensure that they are running. Also, the SPS checks the validity and timeliness of data, especially important with data that is transient. For example, stock prices would update every 15 minutes, while weather updates at least daily. If not, an error is generated.

The SPS enables monitoring from any terminal connected to the system. The SPM comprise other features such as a continuous monitoring of services, SNMP, audible alerts, pager alerts, email alerts, plug-in monitoring agents (e.g., SGW), remote access via browsers, summary screen and detailed maps of the network, and monitoring of servers and services.

Figure 11:
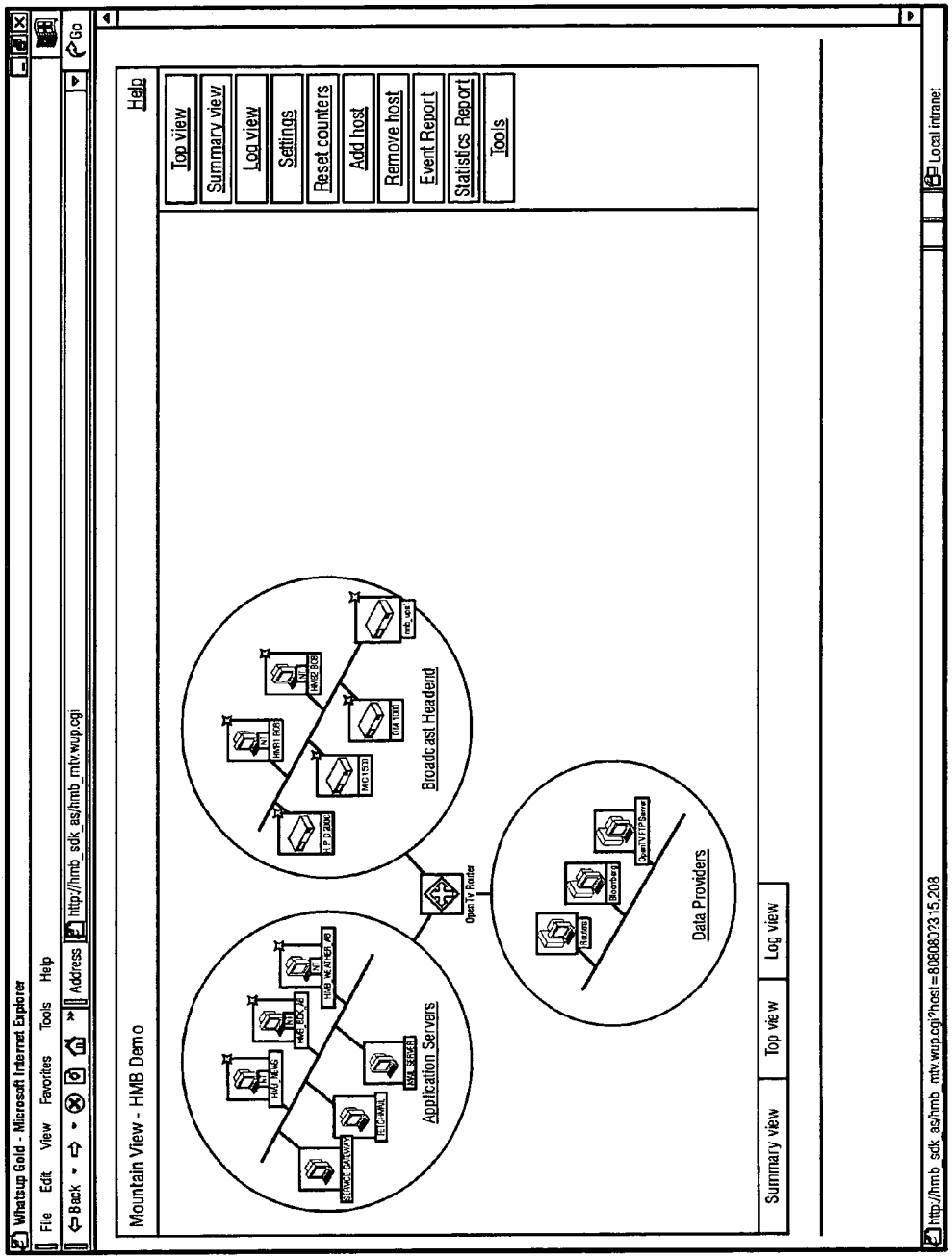
FIG. 11 shows a software implementation of the Service Platform Manager.

A typical software console is shown in FIG. 11. Software comprises a Network Monitor page, which is optionally viewable from Summary view, Top view, and Log view. The administrator can choose to monitor Application Servers, the Broadcast Head End, and Data Providers, monitoring for integrity, timeliness and status of the files.

The present invention provides a large range of quality services has been demonstrated to increase subscriber satisfaction, reduce churn and increase revenue per subscriber. Such positive results can be only be achieved, however, if the subscriber can access these ITV services reliably, 24 hours a day, 365 days per year. Monitoring the integrity of ITV services has different requirements from the monitoring of traditional television transmission. Thus, in order to monitor the integrity of ITV services and efficiently diagnose problems, the entire chain of production and distribution of the ITV content must be monitored. This chain of production and distribution includes data collection points, where external databases (e.g. weather, news, stock) are accessed on a periodic basis, service assembly points, where data (e.g. weather data) is merged with templates (weather navigation pages) to create the final service, broadcast points, where the services are injected into the HFC network and on-line servers, where orders (e.g. Pizza) are collected and personal data (e.g. email) is delivered to individual users.

All components of the production and distribution chain are monitored by Service Platform Monitoring equipment that when dispatched sends alarms to the relevant parties, including third party service providers (e.g. weather), OpenTV (e.g. games) or the network operator (e.g. multiplexers). SNMP is used wherever possible, but preferably not by itself. Public Interface monitoring is used whenever SNMP is not available and in tandem with SNMP when it is. The Public Interface monitoring that is employed is all TCP/IP based. Known services administer known ports (example FTP: port 21) and regular test transactions on these ports provide a method for determining that the associated service is still up-and running.

This type of monitoring is very useful when one has dependencies of external service providers; in this situation it is most likely that SNMP monitoring will simply not be available. Public Interface monitoring is also useful in conjunction with SNMP for ensuring integrity of connectivity and detection of catastrophic events—when Traps simply do not get raised. SNMP MIBS are also regularly interrogated for minimum system requirements, for example disk space on Staging Areas.

The ETR290 Live Stream Analyzer is preferably used to ensure that all Portal Streams which are expected to be broadcast are present and being broadcast at the acceptable quality. Once the application streams have left the Broad Cast servers there are still many things that can go wrong in the Multiple System Operator's or Network Operator's equipment. With no monitoring access to that equipment the ETR290 Analyzer is the last monitoring gate detecting all potential software, hardware, configuration and multiplexing problems.

The Return Path or back Channel is essential in the infrastructure to the Portal and the artery for revenue models. Thus the failure of the Return Path infrastructure can severely impact the portal's integrity. To monitor this a COM object Pings ranges of STB in viewers homes on a regular basis. Multiple sets of ranges ensure coverage of the hierarchical cable infrastructure.

A more subtle but equally important dependency for the Portal is its data sources and TV applications. If the application's data, or the application itself, is required to be updated at regular intervals, then the failure to do this will impact the Portal's integrity. A piece of data is associated with a Data Schedule. The Data Schedule as shown in FIG. 13, dictates the 'Shelf-Life' of a piece data according to periods of time. Thus at any point in time a piece of data has an associated shelf life, that changes according to the time of day, day of week, week of year. Therefore, the integrity of data is no longer just dependent on it adhering to a predefined syntax. A piece of data, or service, losses integrity if it exceeds its current shelf life. Data integrity has a new temporal component to compliment the existing syntactic component.

To monitor these dependencies the present invention provides an SNMP enabled schedule monitor (Schedule Integrity Monitor). Any form of data or application file has one or more associated schedules that the application or data must adhere to. Failure to be updated/refreshed according to the schedules raises SNMP traps to the monitoring equipment. Data failures are treated as seriously as application failures, as both impact the integrity of the Portal and consequently viewer usage. All monitoring information and reporting is accessed through Web interfaces. This allows for the most flexible access to the data. With minimal extra cost monitoring stations can installed literally anywhere in the world.

Network Monitor page is shown in FIG. 12. Column headings indicate items of interest, such as name of service, type of services, number of polls, percent responded, percent missed, down-time, period, number of alerts, average decay, maximum delay, and minimum delay. As an example, the CD Merger service of HMB_News indicates having been polled 9 times; with 77.78% received responses and 22.22% missed responses. The down time is 0 seconds and there are no known alerts. The average delay is 246 msec, with a minimum delay of 0 msec, and a maximum delay of 1046 msec. Clicking with a mouse on the HMB_News link enables the administrator to view a screen for the service types exclusive to HMB_News.

Portal Platform Administration enables an administrator to change the types of services that are monitored. Names of Services, as well as their status, are detailed in a table shown on a page entitled Server Details. Clicking on a checkbox associated with a service selects the service for administering. The administrator also has the ability to add a host, remove a host, obtain an event report, obtain a statistics report, observe settings, reset counters, or choose from among other tools of the system.

At a given rate, the monitor checks the status of external servers by sending a test through a TCP/IP port and obtaining a response. If there is no response, then the administrator is alerted to a possible break in communication lines.

The administrator can maintain and monitor data integrity by setting alarms in case a file (data file, MUX file, configuration file, executable file) becomes older than a specified time. For example, a currently used AccuWeather file must be updated every 15 minutes. Alarms can be set once for a file that is due only one time, or on a periodic basis for data that is time-sensitive, such as weather, horoscope, stock prices, etc. The administrator creates the desired alarm schedule.

The SPS further compiles a series of test results over a given time period into a report enabling a statistical analysis of the status of file updates. An advantage of such a report is that the administrator can be assured that a service provider is keeping up with terms of a given contract.

The front-end page is displayed to the administer through a display device. Such a device can be Internet Explorer on a PC or on a laptop, on a cell phone, PDA, or any other compatible device. The software can monitor across operating system platforms with one system operating in for example, Microsoft WindowsNT and another system operating on Unix.

By clicking on a service, the administrator can call up a Service Schedule Monitor page. A typical such page will display file name, moment of last update, status, and schedule. As an example, a file name is "accu_weather.dat", file status can be "Out of Date", or "Okay". A scheduling grid for this file comprises seven columns labeled on day per column and several rows representing blocks of time during the day. A number, labeled in minutes, found inside this grid indicates the frequency at which said file is updated. As an example, in a column labeled "Mon" and in a row labeled "9:00", a time listing of 120 minutes would indicate that the "accu_weather.dat" file is updated every two hours.

The present invention has been in an example of an iTV system, but may well be embodied in a distributed computer system. In another embodiment, the present invention comprises a computer-read medium, e.g., ROM, RAM, CDROM, flash, or any other memory now known or unknown, containing instructions that when executed cause the computer to implement the invention.

What is claimed is:

1. A method for managing an interactive television system comprising:
   accessing a campaign rule at a server, wherein the campaign rule specifies which one or more advertisements of a plurality of advertisements are to be delivered to a target, said target comprising at least one client device;
   selecting one or more advertisements at the server based on the campaign rule for delivery to the target;
   sending the selected advertisement to the client device;
   deciding in a business filter at the client device, whether to store the selected one or more advertisements on the client device
   receiving a client device user response to the selected one or more advertisements at a rule generating component of the server, wherein the rule generating component is configured to;
     apply one or more rules to the user response to predict further user interests; and
     generate a new campaign rule based on the predicted further user interests;
   based on the new campaign rule, the server selecting a new advertisement to be delivered to the target; and
   the server triggering a delivery manager to deliver the new advertisement to the target.

2. The method of claim 1, further comprising:
   measuring client device user responses to the selected one or more advertisements;
   storing in a user information database user profile information based on the client device user responses; and
   using the user profile information to predict further user interests.

3. The method of claim 1, further comprising:
   selecting the one or more advertisements based on the number of client device users watching.

4. The method of claim 1, further comprising:
   selecting the one or more advertisements at the server based on a specified time frame.

5. The method of claim 1, further comprising:
   accessing a delivery plan to obtain a list of advertisements to send next.

6. The method of claim 1, further comprising:
   selecting the one or more advertisements based on at least one of advertisement priority, weight, minimum display time, back fill Boolean, intra-spot-session frequency cap, intra-application frequency cap, industry exclusion, overall frequency cap, and minimum rotation interval.

7. The method of claim 1, further comprising:
determining the target based on user profile, type of service and context.

8. The method of claim 2, further comprising:
generating the campaign rule based on associating a specified advertisement with a specified service.

9. The method of claim 2, further comprising:
generating a report based on the user response.

10. The method of claim 2, further comprising:
building a product catalog for presentation to the target based on the user response.

11. The method of claim 1 further comprising:
sending a business filter to at least one client device.

12. The method of claim 2, further comprising:
measuring the user response in a client device gadget.

13. The method of claim 2, further comprising:
processing at the server, the user response to generate at least one of a new campaign rule, a new campaign and a new product catalog.

14. The method of claim 2, further comprising:
measuring click through rate, purchase rate and impressions.

15. The method of claim 1, further comprising:
sending the one or more advertisements to a client device gadget for rendering.

16. The method of claim 1, further comprising:
simulating a target attempt to determine if an advertising campaign can be fulfilled before sending the one or more advertisements.

17. The method of claim 1, the one or more advertisements further comprising at least one of a video, imagery and audio data.

18. The method of claim 1, the one or more advertisements further comprising at least one of an entertainment program and an interactive game.

19. The method of claim 1, the one or more advertisements further comprising audio data.

20. The method of claim 1, further comprising selecting the advertisement based on requested impressions.

21. The method of claim 1, further comprising using a mixture of the one or more rules and statistics of measurements of a plurality of client device user responses to predict further user interests.

22. The method of claim 6, wherein said selecting is further based at least in part on advertisement type and target type.

23. A computer readable medium containing instructions that when executed by a computer cause the computer to:
access a campaign rule at a server, wherein the campaign rule specifies which one or more advertisements of a plurality of advertisements are to be delivered to a target, said target comprising at least one client device
select one or more advertisements at the server based on the campaign rule for delivery to the target;
send the selected advertisement to the client device;
decide in a business filter at the client device, whether to store the selected advertisement on the client device;
receive a client device user response to the selected one or more advertisement at a rule generating component of the server, wherein the rule generating component is configured to:
apply one or more rules to the user response to predict further user interests; and
generate a new campaign rule based on the predicted further user interests; based on the new campaign rule cause the server to select a new advertisement to be delivered to the target; and
cause the server to trigger a delivery manager to deliver the new advertisement to the target.

24. The medium of claim 23, further comprising instructions that cause the computer to:
measure client device user responses to the one or more advertisement;
build a new campaign rule based on the client device user response;
select an advertisement based on the new campaign rule and
send the advertisement based on the new campaign rule to the target
store in a user information database, user profile information based on the client device user responses; and
use the user profile information to predict further user interests.

25. The medium of claim 23, further comprising instructions that cause the computer to:
select the one or more advertisements based on requested impressions.

26. The medium of claim 23, further comprising instructions that cause the computer to:
select the one or more advertisements based on the number of client device users watching.

27. The medium of claim 23, further comprising instructions that cause the computer to:
select the one or more advertisements at the server based on a specified time frame.

28. The medium of claim 23, further comprising instructions that cause the computer to:
access a delivery plan to obtain a list of advertisements to send next.

29. The medium of claim 23, further comprising instructions that cause the computer to:
select the one or more advertisements based on at least one of advertisement priority, weight, minimum display time, back fill Boolean, intra-spot-session frequency cap, intra-application frequency cap, industry exclusion, overall frequency cap, and minimum rotation interval.

30. The medium of claim 23, further comprising instructions that cause the computer to:
determine the target based on user profile, type of service and context.

31. The medium of claim 24, further comprising instructions that cause the computer to:
generate the campaign rule based on associating a specified advertisement with a specified service.

32. The medium of claim 24, further comprising instructions that cause the computer to:
generate a report based on the user response.

33. The medium of claim 24, further comprising instructions that cause the computer to:
build a product catalog for presentation to the target based on the user response.

34. The medium of claim 23, further comprising instructions that cause the computer to:
sending a business filter to at least one client device.

35. The medium of claim 24, further comprising instructions that cause the computer to:
measuring the user response in a client device gadget.

36. The medium of claim 24, further comprising instructions that cause the computer to:
process at the server, the user response to generate at least one of a new campaign rule, a new campaign and a new product catalog.

37. The medium of claim 24, further comprising instructions that cause the computer to:
measure click through rate, purchase rate and impressions.

38. The medium of claim 23, further comprising instructions that cause the computer to:
send the one or more advertisements to a client device gadget for rendering.

39. The medium of claim 23, further comprising instructions that cause the computer to:
simulate a target attempt to determine if an advertising campaign can be fulfilled before sending the one or more advertisements.

40. The medium of claim 23, the one or more advertisements further comprising at least one of a video, imagery and audio data.

41. The medium of claim 23, the one or more advertisements further comprising at least one of an entertainment program and an interactive game.

42. The medium of claim 23, the one or more advertisements further comprising audio data.

43. The medium of claim 23, further comprising instructions that cause the computer to use a mixture of the one or more rules and statistics of measurements of a plurality of client device user responses to predict further user interests.

44. A service platform for use in an interactive television system, the service platform comprising:
an advertising manager; and
a delivery manager;
wherein the advertising manager is configured to:
access a campaign rule, wherein the campaign rule specifies which one or more advertisements of a plurality of advertisements are to be delivered to a target, said target comprising at least one client device;
based on the campaign rule, select one or more advertisements for delivery to the target;
send the selected one or more advertisements to the delivery manager for delivery to the client device;
apply one or more rules to a client device user response to the selected one or more advertisements to predict further user interests;
generate a new campaign rule based on the predicted further user interests;
based on the new campaign rule, select a new advertisement to be delivered to the target; and
trigger the delivery manager to include the new advertisement in the one or more advertisements for delivery to the target.

45. The service platform of claim 44, further comprising a viewer manager, wherein the viewer manager is configured to:
measure client device user responses to the selected one or more advertisements;
and
store in a user information database, user profile information based on the client device user responses; and
wherein the advertising manager is further configured to:
retrieve user profile information from the user information database; and
use the retrieved user profile information to predict further user interests.

46. The service platform of claim 44, wherein the advertising manager is further configured to use a mixture of the one or more rules and statistics of measurements of a plurality of client device user responses to predict further user interests.

47. The service platform of claim 44, wherein the advertising manager is further configured to select the one or more advertisements based on the number of client device users watching.

48. The service platform of claim 44, wherein the advertising manager is further configured to select the advertisement based on a specified time frame.

49. The service platform of claim 44, wherein the advertising manager is further configured to access a delivery plan to obtain a list of advertisements to send next.

50. The service platform of claim 44, wherein the advertising manager is further configured to select the advertisement based on at least one of advertisement priority, weight, minimum display time, back fill Boolean, intra-spot-session frequency cap, intra-application frequency cap, industry exclusion, overall frequency cap, and minimum rotation interval.

51. The service platform of claim 44, wherein the advertising manager is further configured to determine the target based on user profile, type of service and context.

52. The service platform of claim 44, wherein the advertising manager is further configured to generate the campaign rule based on associating a specified advertisement with a specified service.

53. The service platform of claim 44, wherein the viewer manager is further configured to generate a report based on the user response.

54. The service platform of claim 44, wherein the delivery manager is further configured to building a product catalog for presentation to the target based on the user response.

55. The service platform of claim 44, wherein the service platform is further configured to send a business filter to at least one client device.

56. The service platform of claim 44, wherein the client device is configured to measure the user response in a client device gadget.

57. The service platform of claim 44, wherein the advertising manager is further configured to process the user response to generate at least one of a new campaign rule, a new campaign, and a new product catalog.

58. The service platform of claim 44, wherein the viewer manager is further configured to measure click through rate, purchase rate, and impressions.

59. The service platform of claim 44, wherein the delivery manager is further configured to send the advertisement to a client device gadget for rendering.

60. The service platform of claim 44, wherein the advertising manager is further configured to simulate an attempt by a target to determine if an advertising campaign can be fulfilled before triggering the delivery manager.

61. The service platform of claim 44, at least one of the one or more advertisements further comprising at least one of a video, imagery, and audio data.

62. The service platform of claim 44, at least one of the one or more advertisements further comprising at least one of an entertainment program and an interactive game.

63. The service platform of claim 44, at least one of the one or more advertisements further comprising audio data.

64. The service platform of claim of claim 44, wherein the advertising manager is further configured to select the one or more advertisements based on requested impressions.

* * * * *

UNITED STATES PATENT AND TRADEMARK OFFICE
CERTIFICATE OF CORRECTION

PATENT NO. : 7,669,212 B2  Page 1 of 1
APPLICATION NO. : 10/061136
DATED : February 23, 2010
INVENTOR(S) : Alao et al.

It is certified that error appears in the above-identified patent and that said Letters Patent is hereby corrected as shown below:

In the Claims:

Claim 1, col. 32, line 36, please insert --;-- after "device".

Claim 2, col. 32, line 52, please insert --,-- after "database" before "user".

Claim 23, col. 33, line 54, please insert --;-- after "device".

Claim 23, col. 33, line 67, please insert --,-- after "rule".

Claim 24, col. 34, line 11, please insert --;-- after "rule".

Signed and Sealed this

Third Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,669,212 B2  Page 1 of 1
APPLICATION NO. : 10/061136
DATED : February 23, 2010
INVENTOR(S) : Alao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2214 days.

Signed and Sealed this

Seventh Day of December, 2010

David J. Kappos
*Director of the United States Patent and Trademark Office*